(12) United States Patent
Rivers

(10) Patent No.: US 10,775,177 B2
(45) Date of Patent: Sep. 15, 2020

(54) SIMPLIFIED ROUTE EXTENSION SYSTEMS AND METHODS

(71) Applicant: FLIR Belgium BVBA, Meer (BE)

(72) Inventor: Mark Rivers, Winchester (GB)

(73) Assignee: FLIR BELGIUM BVBA, Meer (BE)

( * ) Notice: Subject to any disclaimer, the term of this patent is extended or adjusted under 35 U.S.C. 154(b) by 330 days.

(21) Appl. No.: 15/835,206

(22) Filed: Dec. 7, 2017

(65) Prior Publication Data

US 2018/0094934 A1    Apr. 5, 2018

Related U.S. Application Data

(63) Continuation of application No. 15/721,658, filed on Sep. 29, 2017, now Pat. No. 10,488,204, which is a
(Continued)

(51) Int. Cl.
*G01C 21/20* (2006.01)
*G01C 21/34* (2006.01)
(Continued)

(52) U.S. Cl.
CPC ............ *G01C 21/203* (2013.01); *B63B 49/00* (2013.01); *G01C 21/005* (2013.01);
(Continued)

(58) Field of Classification Search
CPC .............. G01C 21/203; G01C 21/3415; G01C 21/343; G01C 21/3484; G01C 21/3614; G01C 21/362
See application file for complete search history.

(56) References Cited

U.S. PATENT DOCUMENTS

| 4,328,568 A | 5/1982 | Webb |
| 4,446,729 A | 5/1984 | Watson, III |

(Continued)

FOREIGN PATENT DOCUMENTS

| EP | 2789981 | 10/2014 |
| GB | 2449560 | 11/2008 |

OTHER PUBLICATIONS

Mosterman et al., "Automating Humanitarian Missions with a Heterogeneous Fleet of Vehicles," Annual Reviews in Control, 2014, pp. 259-270, vol. 38, No. 2, Elsevier.
(Continued)

*Primary Examiner* — Todd Melton
(74) *Attorney, Agent, or Firm* — Haynes and Boone, LLP

(57) ABSTRACT

Techniques are disclosed for systems and methods to provide simplified route extension and/or display for autopiloting mobile structures. A route extension system includes a user interface for a mobile structure and a logic device configured to communicate with the user interface. The user interface includes a display configured to display at least a portion of an established route for the mobile structure. The logic device is configured to receive a first user input indicating a position on a navigational chart, receive a second user input indicating the received position corresponds to an extended route for the mobile structure, determine at least one extension routeleg from an endpoint of the established route to the received position, and render at least a portion of the extended route on the display.

20 Claims, 25 Drawing Sheets

Related U.S. Application Data continuation-in-part of application No. PCT/US2016/024799, filed on Mar. 29, 2016, which is a continuation-in-part of application No. 15/494,232, filed on Apr. 21, 2017, which is a continuation of application No. PCT/US2015/056786, filed on Oct. 21, 2015.

(60) Provisional application No. 62/440,272, filed on Dec. 29, 2016, provisional application No. 62/140,376, filed on Mar. 30, 2015, provisional application No. 62/140,362, filed on Mar. 30, 2015, provisional application No. 62/069,961, filed on Oct. 29, 2014, provisional application No. 62/066,802, filed on Oct. 21, 2014.

(51) Int. Cl.

| | |
|---|---|
| *G01C 21/36* | (2006.01) |
| *G05D 1/02* | (2020.01) |
| *G06F 3/0482* | (2013.01) |
| *G01C 21/00* | (2006.01) |
| *G06F 9/451* | (2018.01) |
| *G08G 3/02* | (2006.01) |
| *G01S 7/62* | (2006.01) |
| *B63B 49/00* | (2006.01) |
| *G08G 3/00* | (2006.01) |
| *G01S 13/937* | (2020.01) |
| *G01S 15/88* | (2006.01) |
| *B63B 35/00* | (2020.01) |
| *G01S 13/86* | (2006.01) |
| *B63H 25/04* | (2006.01) |
| *B63B 79/00* | (2020.01) |
| *G01S 15/86* | (2020.01) |

(52) U.S. Cl.
CPC ..... *G01C 21/3415* (2013.01); *G01C 21/3614* (2013.01); *G01S 7/6272* (2013.01); *G01S 13/937* (2020.01); *G05D 1/0206* (2013.01); *G06F 3/0482* (2013.01); *G06F 9/451* (2018.02); *G08G 3/00* (2013.01); *G08G 3/02* (2013.01); *B63B 79/00* (2020.01); *B63B 2035/009* (2013.01); *B63H 2025/045* (2013.01); *G01S 13/86* (2013.01); *G01S 13/862* (2013.01); *G01S 13/867* (2013.01); *G01S 15/86* (2020.01); *G01S 15/88* (2013.01)

(56) References Cited

U.S. PATENT DOCUMENTS

| | | | |
|---|---|---|---|
| 5,191,341 | A | 3/1993 | Gouard et al. |
| 5,245,587 | A | 9/1993 | Hutson |
| 6,308,649 | B1 | 10/2001 | Gedeon |
| 7,047,114 | B1 | 5/2006 | Rogers |
| 7,444,237 | B2 * | 10/2008 | Dale ................. G01C 21/3415 342/455 |
| 7,714,744 | B1 | 5/2010 | Wichgers |
| 8,155,811 | B2 | 4/2012 | Noffsiner et al. |
| 8,560,227 | B2 * | 10/2013 | Feng ................. G01C 21/3476 701/426 |
| 8,798,815 | B1 | 8/2014 | Burgin et al. |
| 8,855,913 | B2 * | 10/2014 | Certin ............... G01C 21/3484 701/400 |
| 9,529,357 | B1 | 12/2016 | Eggers et al. |
| 9,727,220 | B2 * | 8/2017 | Matsumoto ......... G06F 3/04883 |
| 2002/0183927 | A1 | 12/2002 | Odamura |
| 2004/0249860 | A1 | 12/2004 | Stechschulte et al. |
| 2007/0138347 | A1 | 6/2007 | Ehlers |
| 2007/0168120 | A1 | 7/2007 | Vandenbergh et al. |
| 2008/0278314 | A1 | 11/2008 | Miller et al. |
| 2009/0112459 | A1 | 4/2009 | Lin |
| 2011/0202591 | A1 | 8/2011 | Reis et al. |
| 2011/0238297 | A1 | 9/2011 | Severson |
| 2011/0288695 | A1 | 11/2011 | Gariepy et al. |
| 2013/0271301 | A1 | 10/2013 | Kabel et al. |
| 2013/0286784 | A1 | 10/2013 | Misonoo et al. |
| 2014/0013260 | A1 | 1/2014 | Thomas et al. |
| 2015/0066240 | A1 | 3/2015 | Das Adhikary |
| 2015/0278734 | A1 | 10/2015 | Grant et al. |
| 2015/0339930 | A1 | 11/2015 | McCann et al. |
| 2017/0210449 | A1 | 7/2017 | Frisbie et al. |

OTHER PUBLICATIONS

McLennan, Donald, "15 Apps for Navigating with your Apple or Android Device", Sail Magazine, Jun. 18, 2014, 11 pages [online], [retrieved on Jun. 17, 2016]. Retrieved from the Internet: <URL:http://www.sailmagazine.com/diy/electronics/navigating-the-app-world/>.

Morgere et al., "Electronic Navigational Chart for a Marine Mobile Augmented Reality System", 2014 Oceans—St. John's, IEEE, Sep. 14, 2014, 9 pages [online], [retrieved on Jan. 6, 2015]. Retrieved from the Internet: < URL:10.1109/OCEANS.2014.7003021>.

\* cited by examiner

FIG. 3C

| Name | ID | Brg from last | Dist | Rounding |
|---|---|---|---|---|
| Course 001 | | | | |
| Waypoint 27 | A | | | |
| Waypoint 28 | H | 124°M | 8.1 nm | |
| Waypoint 29 | R | 199°M | 15 nm | |
| Waypoint 30 | K | 311°M | 66 nm | |
| Finish point | W | 012°M | 15 nm | |

Course 001

Add Waypoint

Finish Build

Select a waypoint

| Name | Brg & Rng | Lat/Long | Date |
|---|---|---|---|
| ▦ TODAYS WAYPOINTS ⋮ | | | |
| ◇ Waypoint 001 | 279°M 12.5nm | 25°44'.215 N 079°50'.142 W | 04:45 02/2015 |
| ◇ Waypoint 002 | 279°M 12.5nm | 25°44'.215 N 079°50'.142 W | 04:45 02/2015 |
| ◇ Waypoint 003 | 279°M 12.5nm | 25°44'.215 N 079°50'.142 W | 04:45 02/2015 |

New waypoint

FIG. 8G-3

SIMPLIFIED ROUTE EXTENSION SYSTEMS AND METHODS

CROSS-REFERENCE TO RELATED APPLICATIONS

This application claims the benefit of and priority to U.S. Provisional Patent Application No. 62/440,272 filed Dec. 29, 2016 and entitled "SIMPLIFIED ROUTE EXTENSION SYSTEMS AND METHODS," which is incorporated herein by reference in its entirety.

This application is a continuation-in-part of U.S. patent application Ser. No. 15/721,658 filed Sep. 29, 2017, which is a continuation-in-part of International Patent Application No. PCT/US2016/024799 filed Mar. 29, 2016 and entitled "RACE ROUTE DISTRIBUTION AND ROUTE ROUNDING DISPLAY SYSTEMS AND METHODS," which is hereby incorporated by reference in its entirety.

International Patent Application No. PCT/US2016/024799 claims priority to and the benefit of U.S. Provisional Patent Application No. 62/140,376 filed Mar. 30, 2015 and entitled "ROUTE ROUNDING DISPLAY SYSTEMS AND METHODS," and U.S. Provisional Patent Application No. 62/140,362 filed Mar. 30, 2015 and entitled "RACE ROUTE DISTRIBUTION SYSTEMS AND METHODS," all of which are hereby incorporated by reference in their entirety.

This application is a continuation-in-part of U.S. patent application Ser. No. 15/494,232 filed Apr. 21, 2017, which is a continuation of International Patent Application No. PCT/US2015/056786 filed Oct. 21, 2015 and entitled "PILOT DISPLAY SYSTEMS AND METHODS" which claims priority to and the benefit of U.S. Provisional Patent Application No. 62/069,961 filed Oct. 29, 2014 and entitled "PILOT DISPLAY SYSTEMS AND METHODS" and U.S. Provisional Patent Application No. 62/066,802 filed Oct. 21, 2014 and entitled "ENHANCED SONAR DISPLAY USING CW/FM PULSE OVERLAYS," all of which are hereby incorporated herein by reference in their entirety.

International Patent Application No. PCT/US2016/024799 is related to U.S. patent application Ser. No. 14/983,404 filed Dec. 29, 2015 and entitled "COORDINATED ROUTE DISTRIBUTION SYSTEMS AND METHODS" which claims priority to and the benefit of U.S. Provisional Patent Application No. 62/099,059 filed Dec. 31, 2014 and entitled "COORDINATED ROUTE DISTRIBUTION SYSTEMS AND METHODS," all of which are hereby incorporated by reference in their entirety.

International Patent Application No. PCT/US2016/024799 is also related to International Patent Application No. PCT/US2015/018986 filed Mar. 5, 2015 and entitled "SAILING USER INTERFACE SYSTEMS AND METHODS" which claims priority to and the benefit of U.S. Provisional Patent Application No. 61/949,864 filed Mar. 7, 2014, and entitled "SAILING USER INTERFACE SYSTEMS AND METHODS," all of which are hereby incorporated by reference in their entirety.

TECHNICAL FIELD

One or more embodiments of the invention relate generally to route selection and display and more particularly, for example, to systems and methods for simplified route extension and/or display to users of mobile structures.

BACKGROUND

Modifying a multi-leg programmed route for an autopiloted vehicle can be a risky endeavor, particularly if the vehicle is in the process of navigating an overpopulated, unsafe, and/or turbulent area, such as over open water. Conventionally, extending an already programmed route requires many detailed steps of human interaction with a user interface to re-establish the preset route from scratch and/or requires the user interface to be placed in a "route build" mode, and such processes are prone to error and can inherently limit the accuracy and timeliness of the resulting route, which in turn can be a safety concern as the vehicle traverses the route. For example, such "route build" modes typically block other operations of the user interface, which can hide navigation alerts and other important safety information from a user and/or stall the autopilot at a critical turning point in the previously programmed route.

In particular, when navigating rough waters with navigational hazards, there can be little time for a user to enter waypoints into marine navigation systems and build a safe route responding to the environment or a crisis on the vessel. Anything that can streamline route extension and/or visualization can help maintain safety by allowing a user to focus primarily on the operation of the vehicle. Thus, there is a need for simplified, reliable, and accurate route extension methodologies, particularly in the context of autotpiloting a mobile structure in an unsafe and/or congested area and general operational awareness is at a premium.

SUMMARY

Techniques are disclosed for systems and methods to provide simplified route extension with respect to navigation systems for mobile structures. In accordance with one or more embodiments, a navigation display system may include a logic device, a user interface, a memory, one or more sensors, one or more actuators/controllers, and modules to interface with users, sensors, actuators, and/or other modules of a mobile structure. The logic device may be adapted to receive the route and/or directional data corresponding to the mobile structure and display various portions of the route and/or various types of control signals to a user and/or adjust a directional control signal provided to an actuator of the mobile structure accordingly. For example, various portions of the route and/or various types of control signals may be used to adjust a steering actuator, a propulsion system thrust, and/or other operational systems of the mobile structure. Routes may be rendered and displayed to a user using a combination of graphical and textual indicators to provide for intuitive navigation and may be stored for substantially instantaneous selective recall.

In one embodiment, a system may include a user interface for a mobile structure and a logic device configured to communicate with the user interface. The user interface may include a display configured to display at least a portion of an established route for the mobile structure. The logic device may be configured to receive a first user input indicating a position on a navigational chart; receive a second user input indicating the received position corresponds to an extended route for the mobile structure; determine at least one extension routeleg from an endpoint of the established route to the received position; and render at least a portion of the extended route on the display, where the extended route comprises the at least one extension routeleg, a waypoint of the established route, and/or a routeleg of the established route.

In another embodiment, a method may include receiving, at a user interface for a mobile structure, a first user input indicating a position on a navigational chart, where the user interface comprises a display configured to display at least a portion of an established route for the mobile structure; receiving a second user input indicating the received position corresponds to an extended route for the mobile structure; determining at least one extension routeleg from an endpoint of the established route to the received position; and rendering at least a portion of the extended route on the display, where the extended route comprises the at least one extension routeleg, a waypoint of the established route, and/or a routeleg of the established route.

The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIGS. 3A-C illustrate various display views of a user interface in accordance with embodiments of the disclosure.

Embodiments of the invention and their advantages are best understood by referring to the detailed description that follows. It should be appreciated that like reference numerals are used to identify like elements illustrated in one or more of the figures.

DETAILED DESCRIPTION

Figure 1A:
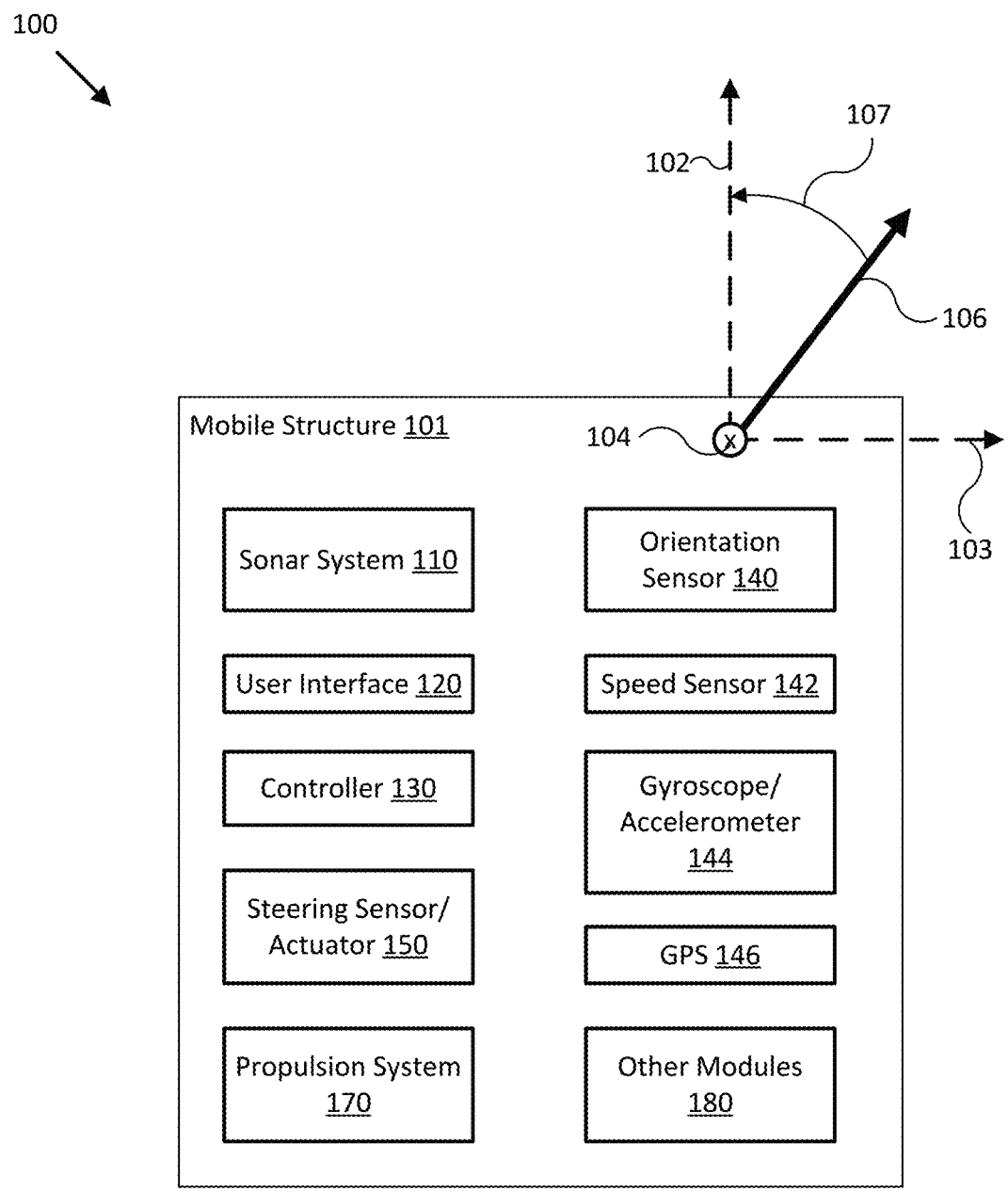
FIG. 1A illustrates a block diagram of a mobile structure including a portion of a race route distribution and/or display system in accordance with an embodiment of the disclosure.

In accordance with various embodiments of the present disclosure, race route distribution and/or display systems and methods may provide routes to mobile structures that are substantially more reliable and accurate than conventional systems across a wide variety of types of structures. For example, conventional race route distribution consists of race organizers providing race teams with a written list of waypoints, including individual latitude and longitude coordinates, and the race teams each entering all the data manually into their own marine navigation electronics. Race teams can make errors when entering any of the data, including the correct order of waypoints and/or the long series of numbers associated with each coordinate entry.

In addition, race organizers may specify a rounding characteristic for a waypoint and/or routeleg (e.g., whether the waypoint should be passed clockwise or counterclockwise when traversing the race route). Conventionally, the rounding characteristic is conveyed to race teams using flags on the course, which can draw teams' attention and distract the teams just at the time when awareness of the positioning of other teams is paramount.

One or more embodiments of the described race route distribution and/or display system may advantageously include a controller and one or more of and one or more of an orientation sensor, a gyroscope, an accelerometer, a position sensor, a speed sensor, and/or a steering sensor/actuator providing measurements of an orientation, position, acceleration, speed, and/or steering angle of the mobile structure. For example, the sensors may be mounted to or within the mobile structure (e.g., a watercraft, aircraft, motor vehicle, and/or other mobile structure), or may be integrated with the user interface and/or the controller. In some embodiments, the disclosed system may be adapted to execute one or more control loops configured to receive race route identifiers (IDs) from a route distribution server and provide the race route IDs to one or more modules of a mobile structure, such as a user interface and/or the controller, as described herein. This allows race organizers to transmit or display IDs, rather than more complex (e.g., and more prone to error) waypoint information, and embodiments of the disclosed system can generate routes from the IDs without users needing to cross reference a waypoint database or enter individual waypoint coordinates. Further, embodiments of the present disclosure can display rounding characteristics to teams in real time without drawing their attention away from their navigational displays and/or competitors.

Various embodiments of the present disclosure may be configured to automatically coordinate steering actuator operations with a race route received by the controller to provide accurate directional control of a mobile structure in accordance with the received race route. Moreover, embodiments of the present disclosure can be easier to use than conventional systems and/or methods through use of intuitive user interface display and selection techniques, as described herein.

As an example, FIG. 1A illustrates a block diagram of a mobile structure 101 including a portion of a race route distribution and/or display system 100 in accordance with an embodiment of the disclosure. In various embodiments, system 100 may be adapted to provide race route distribution, display, and/or corresponding directional control for a particular mobile structure 101. Directional control of a mobile structure may refer to control of any one or combination of yaw, pitch, or roll of mobile structure 101. In some embodiments, system 100 may be adapted to measure an orientation, a position, an acceleration, and/or a speed of mobile structure 101. System 100 may then use these measurements to control operation of mobile structure 101, such as controlling steering actuator 150 and/or propulsion system 170 to steer mobile structure 101 according to a heading along a retrieved route, such as heading angle 107, for example In the embodiment shown in FIG. 1A, system 100 may be implemented to provide race route distribution and/or display for a particular type of mobile structure 101, such as a drone, a watercraft, an aircraft, a robot, a vehicle, and/or other types of mobile structures. In one embodiment, system 100 may include one or more of a sonar system 110, a user interface 120, a controller 130, an orientation sensor 140, a speed sensor 142, a gyroscope/accelerometer 144, a global positioning satellite system (GPS) 146, a steering sensor/actuator 150, a propulsion system 170, and one or more other sensors and/or actuators, such as other modules 180. In some embodiments, one or more of the elements of system 100 may be implemented in a combined housing or structure that can be coupled to mobile structure 101 and/or held or carried by a user of mobile structure 101.

Directions 102, 103, and 104 describe one possible coordinate frame of mobile structure 101 (e.g., for headings or orientations measured by orientation sensor 140 and/or angular velocities and accelerations measured by gyroscope 144 and accelerometer 145). As shown in FIG. 1A, direction 102 illustrates a direction that may be substantially parallel to and/or aligned with a longitudinal axis of mobile structure 101, direction 103 illustrates a direction that may be substantially parallel to and/or aligned with a lateral axis of mobile structure 101, and direction 104 illustrates a direction that may be substantially parallel to and/or aligned with a vertical axis of mobile structure 101, as described herein. For example, a roll component of motion of mobile structure 101 may correspond to rotations around direction 102, a pitch component may correspond to rotations around direction 103, and a yaw component may correspond to rotations around direction 104.

Heading angle 107 may correspond to the angle between a projection of a reference direction 106 (e.g., the local component of the Earth's magnetic field) onto a horizontal plane (e.g., referenced to a gravitationally defined "down" vector local to mobile structure 101) and a projection of direction 102 onto the same horizontal plane. In some embodiments, the projection of reference direction 106 onto a horizontal plane (e.g., referenced to a gravitationally defined "down" vector) may be referred to as Magnetic North. In various embodiments, Magnetic North, a "down" vector, and/or various other directions, positions, and/or fixed or relative reference frames may define an absolute coordinate frame, for example, where directional measurements referenced to an absolute coordinate frame may be referred to as absolute directional measurements (e.g., an "absolute" orientation). In some embodiments, directional measurements may initially be referenced to a coordinate frame of a particular sensor (e.g., a sonar transducer assembly or module of sonar system 110) and be transformed (e.g., using parameters for one or more coordinate frame transformations) to be referenced to an absolute coordinate frame and/or a coordinate frame of mobile structure 101. In various embodiments, an absolute coordinate frame may be defined and/or correspond to a coordinate frame with one or more undefined axes, such as a horizontal plane local to mobile structure 101 referenced to a local gravitational vector but with an unreferenced and/or undefined yaw reference (e.g., no reference to Magnetic North).

Sonar system 110 may be implemented as one or more electrically and/or mechanically coupled controllers, transmitters, receivers, transceivers, signal processing logic devices, various electrical components, transducer elements of various shapes and sizes, multichannel transducers/transducer modules, transducer assemblies, assembly brackets, transom brackets, and/or various actuators adapted to adjust orientations of any of the components of sonar system 110, as described herein. Sonar system 110 may be configured to emit one, multiple, or a series of acoustic beams, receive corresponding acoustic returns, and convert the acoustic returns into sonar data and/or imagery, such as bathymetric data, water depth, water temperature, water column/volume debris, bottom profile, and/or other types of sonar data. Sonar system 110 may be configured to provide such data and/or imagery to user interface 120 for display to a user, for example, or to controller 130 for additional processing.

User interface 120 may be implemented as one or more of a display, a touch screen, a keyboard, a mouse, a joystick, a knob, a steering wheel, a ship's wheel or helm, a yoke, and/or any other device capable of accepting user input and/or providing feedback to a user. For example, in some embodiments, user interface 120 may be implemented and/or operated according to any one or combination of the systems and methods described in U.S. Provisional Patent Application 62/069,961 filed Oct. 29, 2014 and entitled "PILOT DISPLAY SYSTEMS AND METHODS", which is hereby incorporated by reference in its entirety.

In various embodiments, user interface 120 may be adapted to accept user input and provide the user input (e.g., as a type of signal and/or sensor information) to other devices of system 100, such as controller 130. User interface 120 may also be implemented with one or more logic devices that may be adapted to execute instructions, such as software instructions, implementing any of the various processes and/or methods described herein. For example, user interface 120 may be adapted to form communication links, transmit and/or receive communications (e.g., sensor signals, control signals, sensor information, user input, and/or other information), render and/or display a user interface, determine various coordinate frames and/or orientations, determine parameters for one or more coordinate frame transformations, and/or perform coordinate frame transformations, for example, or to perform various other processes and/or methods.

In various embodiments, user interface 120 may be adapted to accept user input, for example, to configure sonar system 110, to form a communication link, to select a particular wireless networking protocol and/or parameters for a particular wireless networking protocol and/or wireless link (e.g., a password, an encryption key, a MAC address, a device identification number, a device operation profile, parameters for operation of a device, and/or other parameters), to select a method of processing sensor signals to determine sensor information, to adjust a position and/or orientation of an articulated sensor, and/or to otherwise facilitate operation of system 100 and devices within system 100. Once user interface 120 accepts a user input, the user input may be processed internally and/or transmitted to other devices of system 100 over one or more communication links.

In one embodiment, user interface 120 may be adapted to receive a sensor or control signal (e.g., from orientation sensor 140 and/or steering sensor/actuator 150) over communication links formed by one or more associated logic devices, for example, and display sensor and/or other information corresponding to the received sensor or control signal to a user. In related embodiments, user interface 120 may be adapted to process sensor and/or control signals to determine sensor and/or other information. For example, a sensor signal may include an orientation, an angular velocity, an acceleration, a speed, and/or a position of mobile structure 101. In such embodiment, user interface 120 may be adapted to process the sensor signals to determine sensor information indicating an estimated and/or absolute roll, pitch, and/or yaw (attitude and/or rate), and/or a position or series of positions of mobile structure 101, for example, and display the sensor information as feedback to a user.

In one embodiment, user interface 120 may be adapted to display a time series of various sensor information and/or other parameters as part of or overlaid on a graph or map, which may be referenced to a position and/or orientation of mobile structure 101. For example, user interface 120 may be adapted to display a time series of positions, headings, and/or orientations of mobile structure 101 and/or other elements of system 100 (e.g., a transducer assembly of sonar system 110) overlaid on a geographical map, which may include a race route, waypoints, one or more graphs indicating a corresponding time series of actuator control signals, sonar data and/or imagery, and/or other sensor and/or control signals. For example, in some embodiments, user interface 120 may be implemented and/or operated according to any one or combination of the systems and methods described in U.S. Provisional Patent Application No. 62/099,059 filed Dec. 31, 2014 and entitled "COORDINATED ROUTE DISTRIBUTION SYSTEMS AND METHODS", and/or U.S. Provisional Patent Application No. 61/949,864 filed Mar. 7, 2014, 2014 and entitled "SAILING USER INTERFACE SYSTEMS AND METHODS", which are hereby incorporated by reference in their entirety.

In some embodiments, user interface 120 may be adapted to accept user input including a user-defined target heading, route, and/or orientation for a transducer assembly, for example, and to generate control signals for steering sensor/actuator 150 and/or propulsion system 170 to cause mobile structure 101 to move according to the target heading, route, and/or orientation. In further embodiments, user interface 120 may be adapted to accept user input including a user-defined target attitude for an actuated device coupled to mobile structure 101 (e.g., sonar system 110), for example, and to generate control signals for adjusting an orientation of the actuated device according to the target attitude. More generally, user interface 120 may be adapted to display a user interface and/or sensor information to a user, for example, and/or to transmit sensor information and/or user input to other user interfaces, sensors, or controllers of system 100, for instance, for display and/or further processing.

Controller 130 may be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a control loop for controlling various operations of sonar system 110, steering sensor/actuator 150, mobile structure 101, and/or system 100, for example. Such software instructions may also implement methods for processing sensor signals, determining sensor information, providing user feedback (e.g., through user interface 120), querying devices for operational parameters, selecting operational parameters for devices, or performing any of the various operations described herein (e.g., operations performed by logic devices of various devices of system 100).

In addition, a machine readable medium may be provided for storing non-transitory instructions for loading into and execution by controller 130. In these and other embodiments, controller 130 may be implemented with other components where appropriate, such as volatile memory, non-volatile memory, one or more interfaces, and/or various analog and/or digital components for interfacing with devices of system 100. For example, controller 130 may be adapted to store configuration settings, sensor signals, sensor information, parameters for coordinate frame transformations, calibration parameters, sets of calibration points, and/or other operational parameters, over time, for example, and provide such stored data to a user using user interface 120. In some embodiments, controller 130 may be integrated with one or more user interfaces (e.g., user interface 120), and, in one embodiment, may share a communication module or modules. As noted herein, controller 130 may be adapted to execute one or more control loops for actuated device control, steering control (e.g., using steering sensor/actuator 150) and/or performing other various operations of mobile structure 101 and/or system 100. In some embodiments, a control loop may include processing sensor signals and/or sensor information in order to control one or more operations of sonar system 110, mobile structure 101, and/or system 100.

Orientation sensor 140 may be implemented as one or more of a compass, float, accelerometer, and/or other device capable of measuring an orientation of mobile structure 101 (e.g., magnitude and direction of roll, pitch, and/or yaw, relative to one or more reference orientations such as gravity and/or Magnetic North) and providing such measurements as sensor signals that may be communicated to various devices of system 100. In some embodiments, orientation sensor 140 may be adapted to provide heading measurements for mobile structure 101. In other embodiments, orientation sensor 140 may be adapted to provide roll, pitch, and/or yaw rates for mobile structure 101 (e.g., using a time series of orientation measurements). Orientation sensor 140 may be positioned and/or adapted to make orientation measurements in relation to a particular coordinate frame of mobile structure 101, for example.

Speed sensor 142 may be implemented as an electronic pitot tube, metered gear or wheel, water speed sensor, wind speed sensor, a wind velocity sensor (e.g., direction and magnitude) and/or other device capable of measuring or determining a linear speed of mobile structure 101 (e.g., in a surrounding medium and/or aligned with a longitudinal axis of mobile structure 101) and providing such measurements as sensor signals that may be communicated to various devices of system 100. In some embodiments, speed sensor 142 may be adapted to provide a velocity of a surrounding medium relative to sensor 142 and/or mobile structure 101.

Gyroscope/accelerometer 144 may be implemented as one or more electronic sextants, semiconductor devices, integrated chips, accelerometer sensors, accelerometer sensor systems, or other devices capable of measuring angular velocities/accelerations and/or linear accelerations (e.g., direction and magnitude) of mobile structure 101 and providing such measurements as sensor signals that may be communicated to other devices of system 100 (e.g., user interface 120, controller 130). Gyroscope/accelerometer 144 may be positioned and/or adapted to make such measurements in relation to a particular coordinate frame of mobile structure 101, for example. In various embodiments, gyroscope/accelerometer 144 may be implemented in a common housing and/or module to ensure a common reference frame or a known transformation between reference frames.

GPS 146 may be implemented as a global positioning satellite receiver and/or other device capable of determining absolute and/or relative position of mobile structure 101 based on wireless signals received from space-born and/or terrestrial sources, for example, and capable of providing such measurements as sensor signals that, may be communicated to various devices of system 100. In some embodiments, GPS 146 may be adapted to determine a velocity, speed, and/or yaw rate of mobile structure 101 (e.g., using a time series of position measurements), such as an absolute velocity and/or a yaw component of an angular velocity of mobile structure 101. In various embodiments, one or more logic devices of system 100 may be adapted to determine a calculated speed of mobile structure 101 and/or a computed yaw component of the angular velocity from such sensor information.

Steering sensor/actuator 150 may be adapted to physically adjust a heading of mobile structure 101 according to one or more control signals, user inputs, and/or other signals provided by a logic device of system 100, such as controller 130. Steering sensor/actuator 150 may include one or more actuators and control surfaces (e.g., a rudder or other type of steering mechanism) of mobile structure 101, and may be adapted to physically adjust the control surfaces to a variety of positive and/or negative steering angles/positions.

Propulsion system 170 may be implemented as a propeller, turbine, or other thrust-based propulsion system, a mechanical wheeled and/or tracked propulsion system, a sail-based propulsion system, and/or other types of propulsion systems that can be used to provide motive force to mobile structure 101. For example, in some embodiments, propulsion system 170 may be implemented as a sailing propulsion system including one or more masts, booms, sails, and/or one or more sensors and/or actuators adapted to sense and/or adjust a boom angle, a sail trim, and/or other operational parameters of a sailing propulsion system, as described herein.

In some embodiments, propulsion system 170 may be non-articulated, for example, such that the direction of motive force and/or thrust generated by propulsion system 170 is fixed relative to a coordinate frame of mobile structure 101. Non-limiting examples of non-articulated propulsion systems include, for example, an inboard motor for a watercraft with a fixed thrust vector, for example, or a fixed aircraft propeller or turbine. In other embodiments, propulsion system 170 may be articulated, for example, and may be coupled to and/or integrated with steering sensor/actuator 150, for example, such that the direction of generated motive force and/or thrust is variable relative to a coordinate frame of mobile structure 101. Non-limiting examples of articulated propulsion systems include, for example, an outboard motor for a watercraft, an inboard motor for a watercraft with a variable thrust vector/port (e.g., used to steer the watercraft), a sail, or an aircraft propeller or turbine with a variable thrust vector, for example.

Other modules 180 may include other and/or additional sensors, actuators, communications modules/nodes, and/or user interface devices used to provide additional environmental information of mobile structure 101, for example. In some embodiments, other modules 180 may include a humidity sensor, a wind and/or water temperature sensor, a barometer, a radar system, a visible spectrum camera, an infrared camera, and/or other environmental sensors providing measurements and/or other sensor signals that can be displayed to a user and/or used by other devices of system 100 (e.g., controller 130) to provide operational control of mobile structure 101 and/or system 100 that compensates for environmental conditions, such as wind speed and/or direction, swell speed, amplitude, and/or direction, and/or an object in a path of mobile structure 101, for example. In some embodiments, other modules 180 may include one or more actuated devices (e.g., spotlights, cameras, radars, sonars, and/or other actuated devices) coupled to mobile structure 101, where each actuated device includes one or more actuators adapted to adjust an orientation of the device, relative to mobile structure 101, in response to one or more control signals (e.g., provided by controller 130). In further embodiments, other modules 180 may include a VHF radio receiver, a mobile phone and/or a mobile phone interface, and/or a camera configured to receive race route data and/or IDs from a race route generator and/or distribution server, as described herein.

In general, each of the elements of system 100 may be implemented with any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as software instructions implementing a method for providing sonar data and/or imagery, for example, or for transmitting and/or receiving communications, such as sensor signals, sensor information, and/or control signals, between one or more devices of system 100. In one embodiment, such method may include instructions to receive an orientation, acceleration, position, and/or speed of mobile structure 101 and/or sonar system 110 from various sensors, to determine a transducer orientation adjustment (e.g., relative to a desired transducer orientation) from the sensor signals, and/or to control an actuator to adjust a transducer orientation accordingly, for example. In a further embodiment, such method may include instructions for forming one or more communication links between various devices of system 100.

In addition, one or more machine readable mediums may be provided for storing non-transitory instructions for loading into and execution by any logic device implemented with one or more of the devices of system 100. In these and other embodiments, the logic devices may be implemented with other components where appropriate, such as volatile memory, non-volatile memory, and/or one or more interfaces (e.g., inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces, such as an interface for one or more antennas, or an interface for a particular type of sensor).

Each of the elements of system 100 may be implemented with one or more amplifiers, modulators, phase adjusters, beamforming components, digital to analog converters (DACs), analog to digital converters (ADCs), various interfaces, antennas, transducers, and/or other analog and/or digital components enabling each of the devices of system 100 to transmit and/or receive signals, for example, in order to facilitate wired and/or wireless communications between one or more devices of system 100. Such components may be integrated with a corresponding element of system 100, for example. In some embodiments, the same or similar components may be used to perform one or more sensor measurements, as described herein. For example, the same or similar components may be used to receive and/or display race route data and/or IDs, and/or store sensor information, configuration data, and/or other data corresponding to operation of system 100, as described herein. Sensor signals, control signals, and other signals may be communicated among elements of system 100 using a variety of wired and/or wireless communication techniques, including voltage signaling, Ethernet, WiFi, Bluetooth, Zigbee, Xbee, Micronet, or other medium and/or short range wired and/or wireless networking protocols and/or implementations, for example. In such embodiments, each element of system 100 may include one or more modules supporting wired, wireless, and/or a combination of wired and wireless communication techniques.

In some embodiments, various elements or portions of elements of system 100 may be integrated with each other, for example, or may be integrated onto a single printed circuit board (PCB) to reduce system complexity, manufacturing costs, power requirements, and/or timing errors between the various sensor measurements. For example, gyroscope/accelerometer 144 and controller 130 may be configured to share one or more components, such as a memory, a logic device, a communications module, and/or other components, and such sharing may act to reduce and/or substantially eliminate such timing errors while reducing overall system complexity and/or cost.

Each element of system 100 may include one or more batteries or other electrical power storage devices, for example, and may include one or more solar cells or other electrical power generating devices (e.g., a wind or water-powered turbine, or a generator producing electrical power from motion of one or more elements of system 100). In some embodiments, one or more of the devices may be powered by a power source for mobile structure 101, using one or more power leads. Such power leads may also be used to support one or more communication techniques between elements of system 100.

In various embodiments, a logic device of system 100 (e.g., of orientation sensor 140 and/or other elements of system 100) may be adapted to determine parameters (e.g., using signals from various devices of system 100) for transforming a coordinate frame of sonar system 110 and/or other sensors of system 100 to/from a coordinate frame of mobile structure 101, at-rest and/or in-motion, and/or other coordinate frames, as described herein. One or more logic devices of system 100 may be adapted to use such parameters to transform a coordinate frame of sonar system 110 and/or other sensors of system 100 to/from a coordinate frame of orientation sensor 140 and/or mobile structure 101, for example. Furthermore, such parameters may be used to determine and/or calculate one or more adjustments to an orientation of sonar system 110 that would be necessary to physically align a coordinate frame of sonar system 110 with a coordinate frame of orientation sensor 140 and/or mobile structure 101, for example, or an absolute coordinate frame. Adjustments determined from such parameters may be used to selectively power adjustment servos/actuators (e.g., of sonar system 110 and/or other sensors or elements of system 100), for example, or may be communicated to a user through user interface 120, as described herein.

Figure 1B:
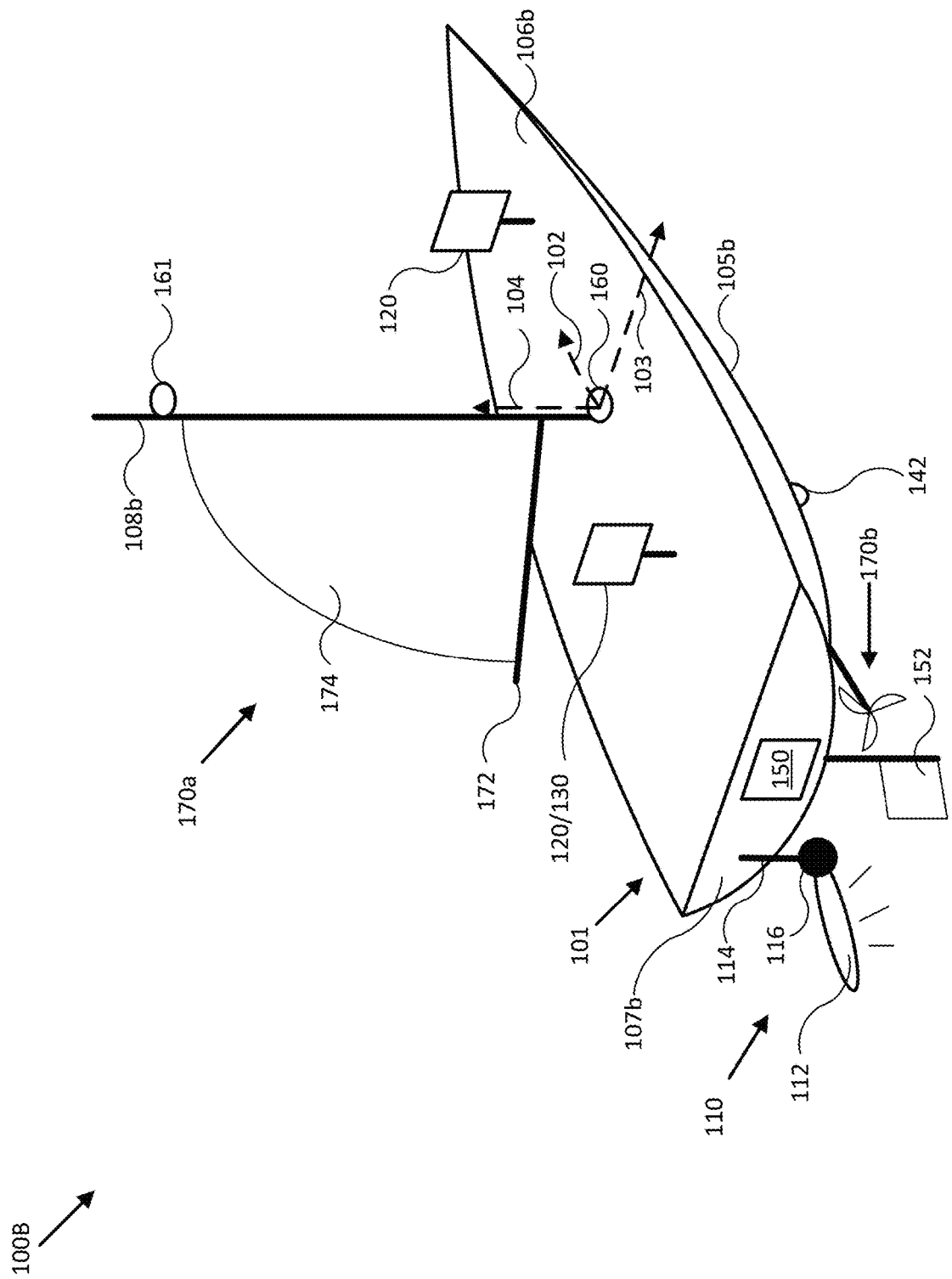
FIG. 1B illustrates a diagram of a watercraft including a portion of a race route distribution and/or display system in accordance with an embodiment of the disclosure.

FIG. 1B illustrates a diagram of system 100B in accordance with an embodiment of the disclosure. In the embodiment shown in FIG. 1B, system 100B may be implemented to provide race route distribution and/or display for use with operation of mobile structure 101, similar to system 100 of FIG. 1A. For example, system 100B may include sonar system 110, integrated user interface/controller/sonar controller 120/130, secondary user interface 120, steering sensor/actuator 150, sensor cluster 160 (e.g., orientation sensor 140, gyroscope/accelerometer 144, and/or GPS 146), imager cluster 161, and various other sensors and/or actuators. In the embodiment illustrated by FIG. 1B, mobile structure 101 is implemented as a ship including a hull 105*b*, a deck 106*b*, a transom 107*b*, a mast/sensor mount 108*b*, a rudder 152, a sail system 170*a* and/or an inboard motor 170*b*, and sonar system 110 including transducer assembly 112 coupled to transom 107*b*. In other embodiments, hull 105*b*, deck 106*b*, mast/sensor mount 108*b*, rudder 152, propulsion systems 170*a* and/or 170*b*, and various actuated devices may correspond to attributes of a passenger aircraft or other type of vehicle, robot, or drone, for example, such as an undercarriage, a passenger compartment, an engine/engine compartment, a trunk, a roof, a steering mechanism, a headlight, a radar system, and/or other portions of a vehicle.

Also depicted in FIG. 1B, sail system 170*a* of mobile structure 101 includes sail 174 coupled to mast/sensor mount 108*b* and boom 172. Other embodiments of sail system 170 may include multiple sails, masts, and/or booms in various configurations, such as configurations including one or more jibs, spinnakers, mainsails, headsails, and/or various multi-mast configurations. In some embodiments, sail system 170 may be implemented with various actuators to adjust various aspects of sail system 170, such as a boom angle for boom 172 or a sail trim for sail 174. For example, a portion of either mast/sensor mount 108*b* or boom 172 may be configured to rotate under power from a corresponding mast or boom actuator (e.g., embedded within mast/sensor mount 108*b* and/or boom 172) and partially or fully furl sail 174. In one embodiment, user interface/controller 120/130 may be configured to determine an estimated maximum speed for mobile structure 101 for a particular orientation (e.g., heading/yaw, roll, and/or pitch) of mobile structure 101 relative to a current wind direction, for example. In such embodiment, user interface/controller 120/130 may be configured to steer mobile structure 101 towards the corresponding heading using steering sensor/actuator 150 and/or to adjust a roll and/or pitch of mobile structure 101, using actuators to adjust a boom angle of boom 172 and/or a furl state of sail 174 for example, to conform mobile structure 101 to the corresponding particular roll and/or pitch to help reach the estimated maximum speed.

In one embodiment, user interfaces 120 may be mounted to mobile structure 101 substantially on deck 106*b* and/or mast/sensor mount 108*b*. Such mounts may be fixed, for example, or may include gimbals and other leveling mechanisms/actuators so that a display of user interfaces 120 stays substantially level with respect to a horizon and/or a "down" vector (e.g., to mimic typical user head motion/orientation). In another embodiment, at least one of user interfaces 120 may be located in proximity to mobile structure 101 and be mobile throughout a user level (e.g., deck 106*b*) of mobile structure 101. For example, secondary user interface 120 may be implemented with a lanyard and/or other type of strap and/or attachment device and be physically coupled to a user of mobile structure 101 so as to be in proximity to mobile structure 101. In various embodiments, user interfaces 120 may be implemented with a relatively thin display that is integrated into a PCB of the corresponding user interface in order to reduce size, weight, housing complexity, and/or manufacturing costs.

As shown in FIG. 1B, in some embodiments, speed sensor 142 may be mounted to a portion of mobile structure 101, such as to hull 105*b*, and be adapted to measure a relative water speed. In some embodiments, speed sensor 142 may be adapted to provide a thin profile to reduce and/or avoid water drag. In various embodiments, speed sensor 142 may be mounted to a portion of mobile structure 101 that is substantially outside easy operational accessibility. Speed sensor 142 may include one or more batteries and/or other electrical power storage devices, for example, and may include one or more water-powered turbines to generate electrical power. In other embodiments, speed sensor 142 may be powered by a power source for mobile structure 101, for example, using one or more power leads penetrating hull 105*b*. In alternative embodiments, speed sensor 142 may be implemented as a wind velocity sensor, for example, and may be mounted to mast/sensor mount 108*b* (e.g., at imager cluster 161) to have relatively clear access to local wind.

In the embodiment illustrated by FIG. 1B, mobile structure 101 includes direction/longitudinal axis 102, direction/lateral axis 103, and direction/vertical axis 104 meeting approximately at mast/sensor mount 108*b* (e.g., near a center of gravity of mobile structure 101). In one embodiment, the various axes may define a coordinate frame of mobile structure 101 and/or sensor cluster 160. Each sensor adapted to measure a direction (e.g., velocities, accelerations, headings, or other states including a directional component) may be implemented with a mount, actuators, and/or servos that can be used to align a coordinate frame of the sensor with a coordinate frame of any element of system 100B and/or mobile structure 101. Each element of system 100B may be located at positions different from those depicted in FIG. 1B. Each device of system 100B may include one or more batteries or other electrical power storage devices, for example, and may include one or more solar cells or other electrical power generating devices. In some embodiments, one or more of the devices may be powered by a power source for mobile structure 101. As noted herein, each element of system 100B may be implemented with an antenna, a logic device, and/or other analog and/or digital components enabling that element to provide, receive, and process sensor signals and interface or communicate with one or more devices of system 100B. Further, a logic device of that element may be adapted to perform any of the methods described herein.

Figure 1C:
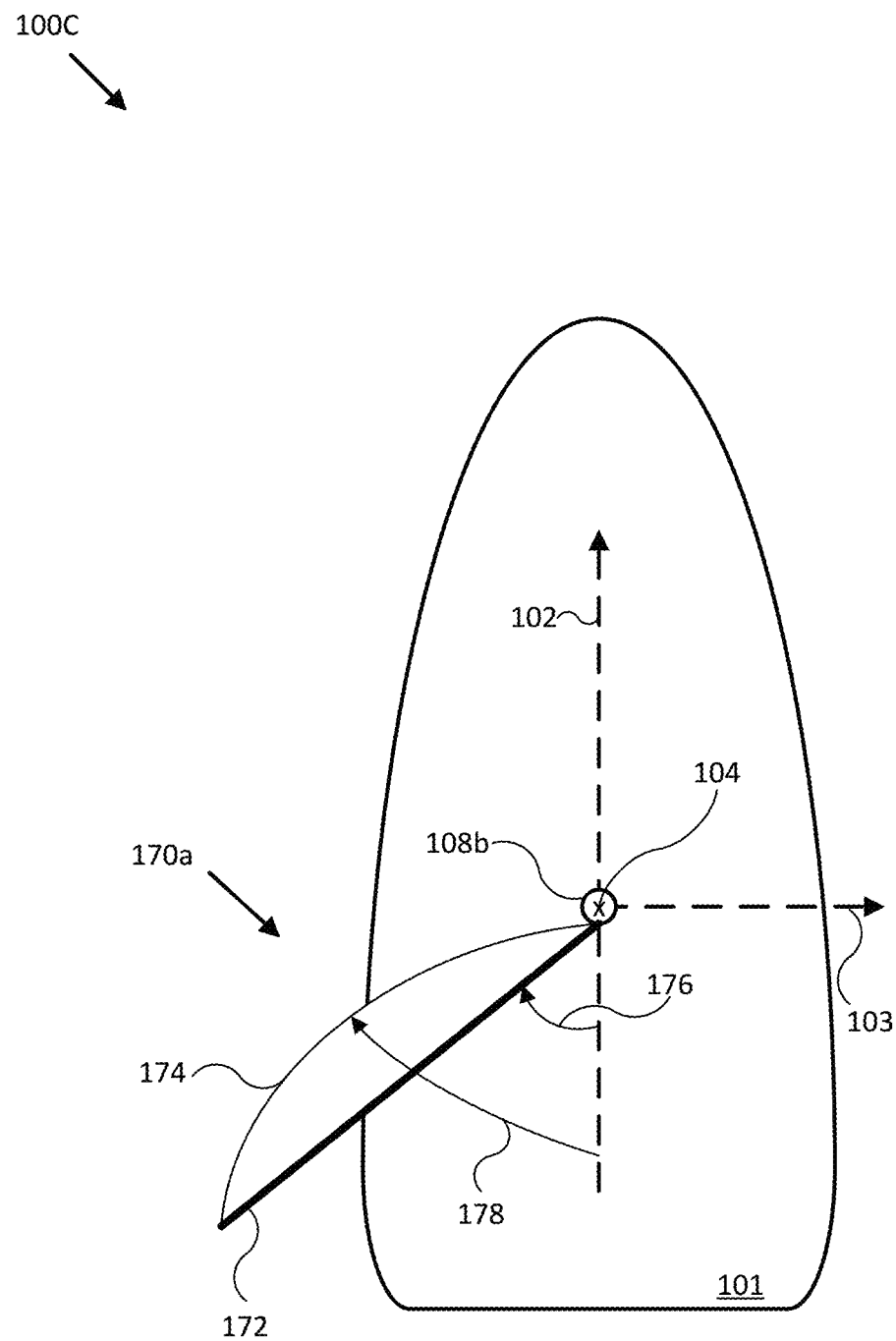
FIG. 1C illustrates a diagram of a watercraft including a portion of a race route distribution and/or display system in accordance with an embodiment of the disclosure.

FIG. 1C illustrates a diagram of a system 100C in accordance with an embodiment of the disclosure. In the embodiment shown in FIG. 1C, system 100C may be implemented to provide race route distribution and/or display for mobile structure 101, similar to system 100B of FIG. 1B. For example, system 100C may include various sensors and/or actuators of systems 100 and/or 100B. In the embodiment illustrated by FIG. 1C, mobile structure 101 is implemented as a sailboat including sail system 170*a*. Similar to FIG. 1B, sail system 170*a* of FIG. 1C includes sail 174 coupled to mast/sensor mount 108*b* and boom 172. Also shown are boom angle 176, which may be adjusted by a boom angle actuator integrated with mast/sensor mount 108*b* and/or boom 172, and sail trim 178. In some embodiments, sail trim 178 may correspond to the angle between longitudinal axis 102 and a tangent plane of sail 174, where the tangent plane of sail 174 roughly corresponds to an aggregate moment of sail 174 taking into account any billowing or other shape of sail 174 due to the competing forces of wind and the tension between sail 174, boom 172, and mast/sensor mount 108*b*. More generally, sail trim 178 may correspond to the shape and angle of sail 174 relative to the present wind direction.

In some embodiments, sail trim 178 may be adjusted by one or more actuators configured to incrementally furl and/or unfurl sail 174, to increase and/or decrease tension between sail 174 and mast/sensor mount 108*b* and/or boom 172, and/or to adjust boom angle 176. In various embodiments, sail trim 178 may be used to adjust a pitch, roll, and/or speed/acceleration of mobile structure 101 separately from adjusting a heading/steering angle of mobile structure 101. For example, user interface/controller 120/130 may be configured adjust sail trim 178 to adjust a roll and/or pitch of mobile structure 101, using actuators to adjust a boom angle of boom 172 and/or a furl state of sail 174 for example, to conform mobile structure 101 to an orientation corresponding to an estimated maximum speed.

Figure 2:
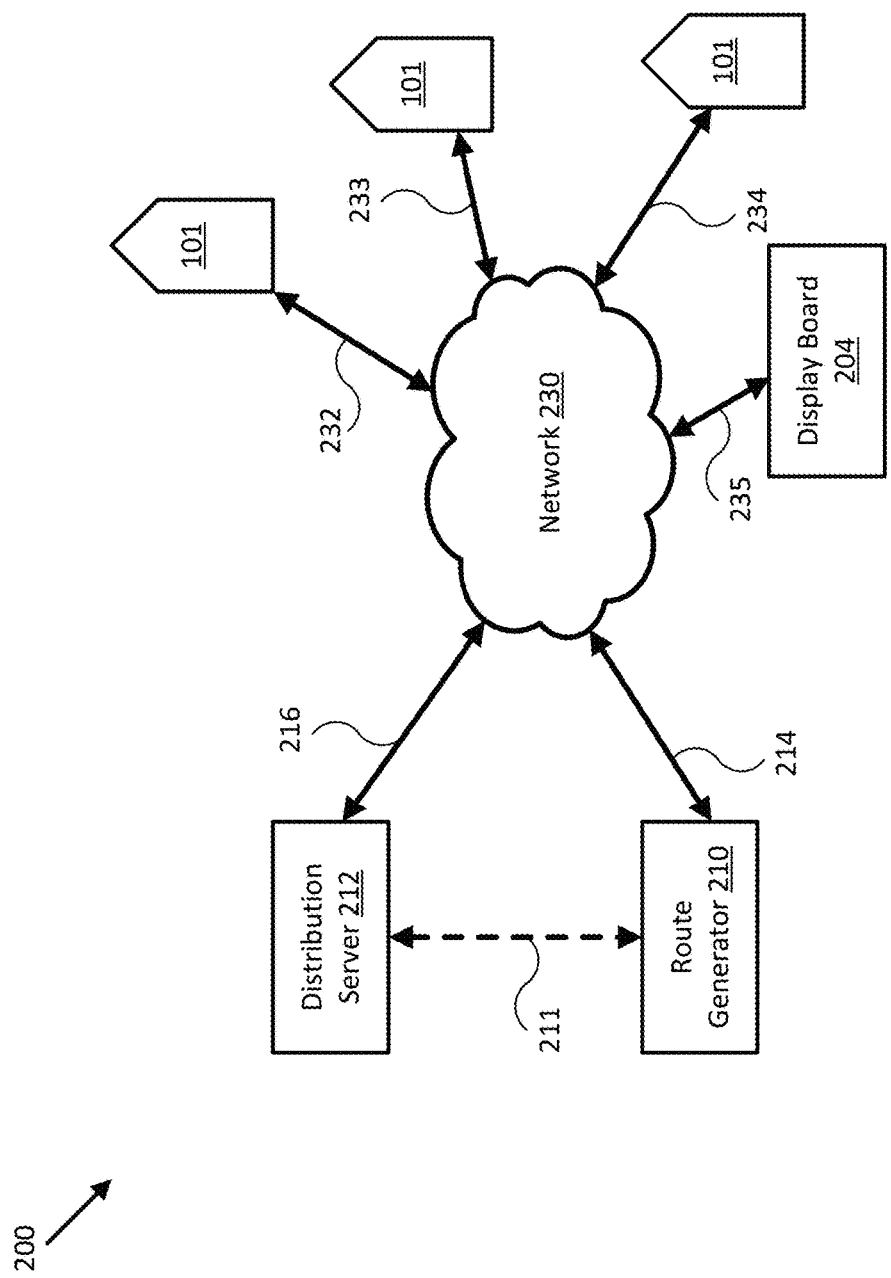
FIG. 2 illustrates a block diagram of a race route distribution and/or display system in accordance with an embodiment of the disclosure.

FIG. 2 illustrates a block diagram of a race route distribution and/or display system 200 in accordance with an embodiment of the disclosure. As can be seen in FIG. 2, system 200 may include a route generator 210 configured to communicate with a route distribution server 212 over a combination of communication links 214 and 216 and network 230 and/or optional direct communication link 211. Various mobile structures 101 and/or display board 204 may each be configured to receive race route data and/or IDs from route generator 210 and/or distribution server 212 over some combination of communication links 214-216, network 230, and/or respective communication links 232-235. Each of mobile structures 101 and (e.g., watercraft) may be implemented as described with respect to mobile structure 101 of FIGS. 1A-C. Display board 204 may be implemented as a display configured to provide race route data to large groups of user simultaneously, for example, or may be implemented as a printer configured to provide physical copies of race route data to various users. In various embodiments, communication links 211, 214, 216, and 232-235, and network 230, may include one or more wired and/or wireless network interfaces, protocols, topologies, and/or methodologies, as described herein.

In typical operation, route generator 210 may be configured to generate a race route for mobile structures 101 and to provide the race route to distribution server 212 and/or display board 204. Each of mobile structures 101 may then access distribution server 212 and/or display board 204 and retrieve the race route. In addition, each of mobile structures 101 may be configured to provide corresponding operational data to distribution server 212, such as indicating successful retrieval of a corresponding route, providing position data for a corresponding mobile structure, and/or providing other sensor data, such as environmental data corresponding to the mobile structure. In various embodiments, the race route and/or the operational data may be time stamped to differentiate old and updated routes and/or operational data.

In some embodiments, route generator 210 may be implemented as a logic device, a tablet computer, laptop, desktop, and/or server computer that may be configured to access various sources of environmental data and/or forecast models associated with a geographical area in which a race route is desired. In other embodiments, route generator 210 may be configured to receive a particular race route from race organizers, convert it to race route IDs and/or waypoints, and then provide the race route IDs and/or waypoints to any of the other elements of system 200.

In some embodiments, route generator 210 may be configured to provide a racemark database of waypoints to mobile structures 101 electronically prior to providing a particular race route within the database of race waypoints (e.g., "racemarks"). In other embodiments, such database may be provided in written form for entry into a navigation system by each team. Such racemark database may include a cross reference of various detailed information of the waypoints to simplified IDs for each of the waypoints to facilitate a simpler and less prone to error distribution of a particular race route. Detailed information may include IDs, textual names, a designated color, coordinates, and/or other detailed information. In some embodiments, such racemarks may be virtual aids to navigation (virtual ATONs) that may be entered into the racemark database in a fashion similar to other physical racemarks. Such virtual ATON type racemarks could be updated dynamically during a race, and would eliminate a need to lay physical race buoys to describe a course. In some embodiments, virtual ATON type racemarks may be indicated in a racemark database and/or in a format for a particular race route ID. Table 1 illustrates a portion of an example racemark database.

TABLE 1

| ID | Name | Color | Lat N | Long W |
|----|------|-------|-------|--------|
| 7W | After Barn | G | 50 51.53 | 01 20.82 |
| 3P | Bainbridge International | Y | 50 45.68 | 01 19.98 |
| 73 | Bald Head | G | 50 49.80 | 01 18.07 |
| 4W | Bart's Bash | Y | 50 47.33 | 01 14.59 |

Sources of environmental data and/or forecast models associated with a geographical area may include, for example, various satellite, radar, barometric, and/or other weather related data provided by a weather information source, various weather and/or ocean forecast models available over the Internet and/or other networks (e.g., BLUElink, HYCOM NCEP, HYCOM Navy), one or more remote sensing/reporting modules (e.g., a self-locating datum marker buoy or SLDMB), and the various mobile structures themselves (e.g., if the mobile structures are configured to provide operational data back to distribution server 212 and/or route generator 210).

Distribution server 212 may be implemented as a logic device, a tablet computer, laptop, desktop, and/or server computer that may be configured receive routes generated by route generator 210 and provide them to mobile structures 101 and/or display board 204. In one embodiment, distribution server 212 may be implemented as an email server, a twitter server, an FTP server, a text message server, and/or other data and/or ASCII file server configured to allow and/or mediate distribution of routes generated by route generator 210 to mobile structures 101 and/or display board 204. In addition, distribution server 212 may be configured to monitor access to such routes and/or indicate successful retrieval of individual routes to route generator 210 (e.g., which can halt a race based on whether a particular race route is successfully retrieved and/or when it is successfully retrieved, relative to various environmental conditions).

In embodiments where mobile structures 101 are configured to provide operational data back to distribution server 212 and/or route generator 210, distribution server 212 may be configured to receive the operational data and/or provide it to route generator 210 and/or to other ones of mobile structures 101 and/or display board 204. Although distribution server 212 is shown separate from route generator 210 in FIG. 2, in some embodiments route generator 210 and distribution server 212 may be integrated into one logic device, tablet computer, laptop, desktop, and/or server computer. Also, although network 230 is shown as one element in FIG. 2, in various embodiments, network 210 may include multiple network infrastructures and/or combinations of infrastructures where, for example, each mobile structure 101 and/or display board 204 may be configured to use substantially different network infrastructures to access distribution server 212.

Figure 3A:
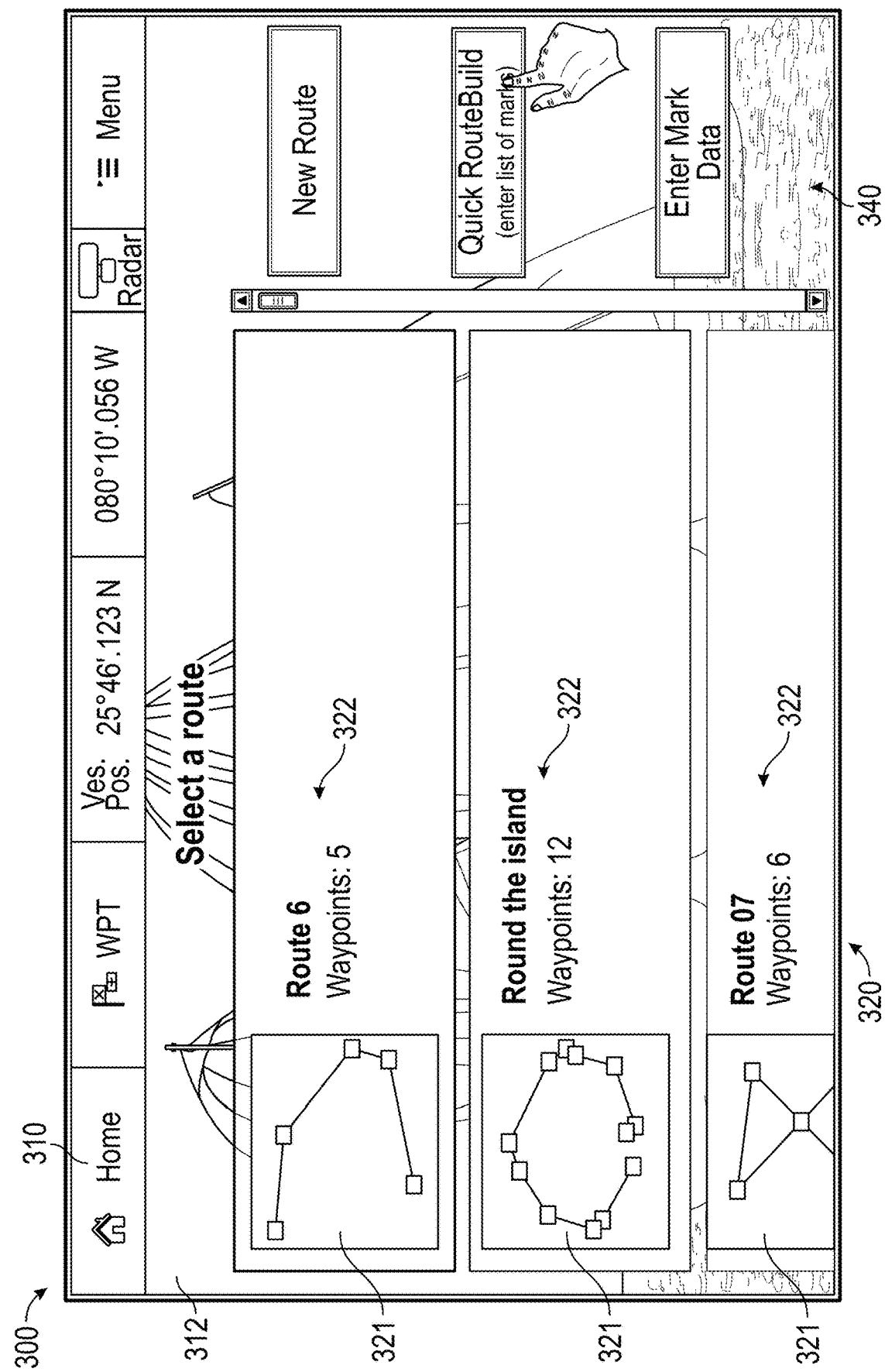
Figure 3B:
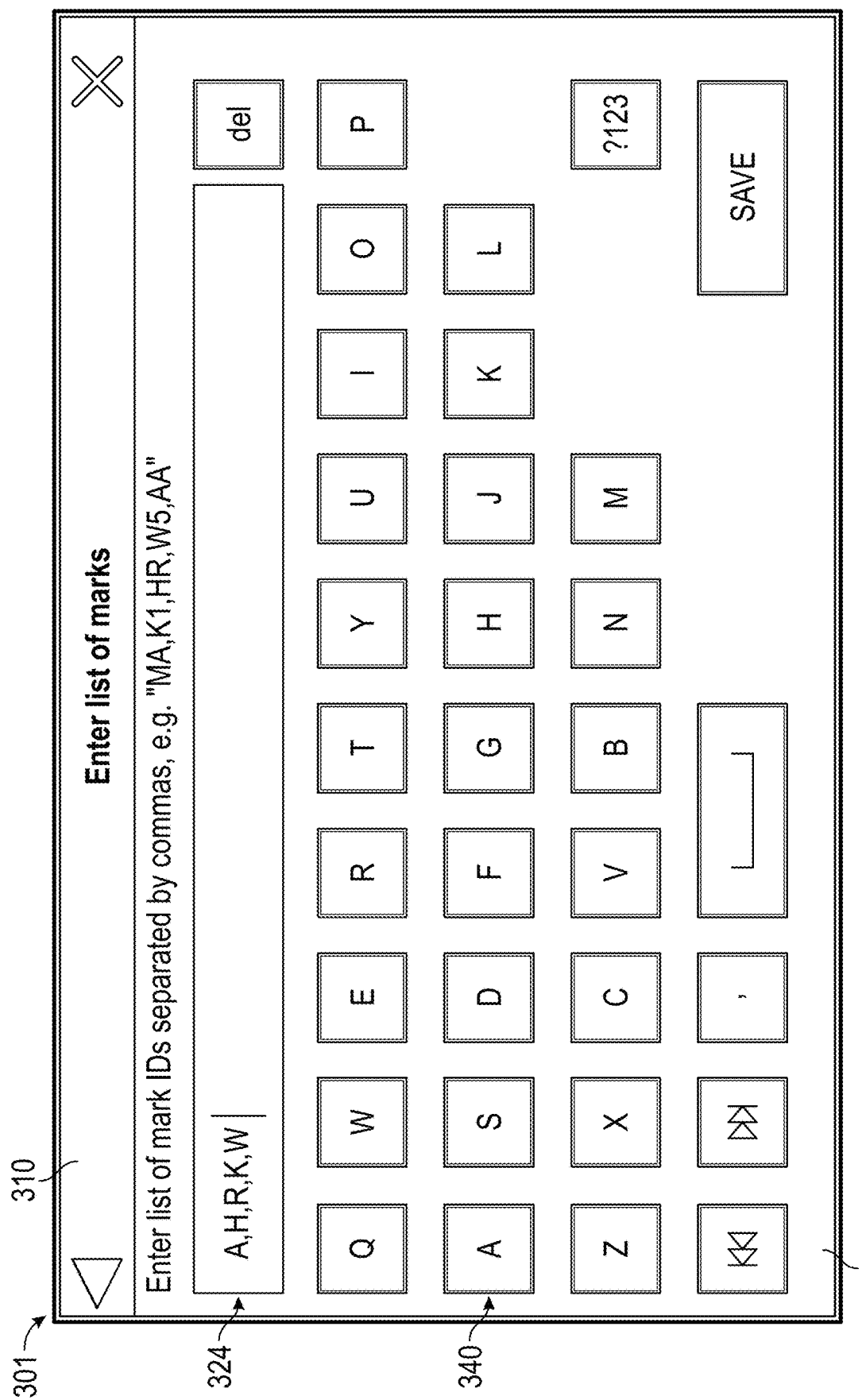

In embodiments where race routes IDs are provided to display board 204 and/or to elements of mobile structures 101 that are unable to directly convert them to a race route, user interface 120/controller 130 may be configured to accept user input corresponding to the user IDs and generate the race route. As an example, FIGS. 3A-C illustrate various display views of a user interface 120 (e.g., which may be implemented as a touch screen or otherwise electronically selectable user interface) in accordance with embodiments of the disclosure. As shown in FIG. 3A, display view 300 includes header 310 and routing interface 312. In the embodiment shown in FIG. 3A, header 310 includes user selectable buttons to change the display and/or various environmental data, such as current position, next waypoint, and/or current heading, for example. Also shown, routing interface 312 includes route selection interface/column 320, which may include graphical route representations 321 and/or textual route information 322, and user buttons 340. Once a series of race route IDs are received, user interface 120 may be configured to provide display view 300 to a user and receive user input to build a new race route (e.g., labeled "Quick RouteBuild" in FIG. 3A). In other embodiments, user interface 120 may be configured to receive user input to create a route without IDs (e.g., labeled "New Route" in FIG. 3A), to enter or create a racemark database (e.g., labeled "Enter Mark Data" in FIG. 3A), to select a previously identified route in column 320, and/or to provide other user interaction with routing interface 312, as described herein.

After a user selects to build a new race route from race route IDs, user interface 120 may be configured to provide display view 301 of FIG. 3B, which includes header 310 and routing interface 312 configured to allow a user to enter a series of race route IDs. As shown in the embodiment provided by FIG. 3B, routing interface 312 includes ID series display 324 and user buttons 340 configured to provide for error free entry of a series of race route IDs as shown in ID series display 324. Once the series is entered, user interface 120 may be configured to accept user input saving the series.

After a user selects to save a series of race route IDs, user interface 120 may be configured to provide display view 302 of FIG. 3C, which includes header 310 and routing interface 312 configured to allow a user to view the series of entered race route IDs along with various waypoint and/or routeleg (e.g., portions of the race route between waypoints) characteristics of the race route determined from the race route IDs. As shown in FIG. 3C, routing interface 312 may include various route information interfaces/columns (e.g., columns 326-334) and user buttons 340 configured to provide information for a user to check the validity of the race route and the series of race route IDs and either adjust the race route or finish building the route (e.g., determine additional waypoint or routeleg characteristics from their relative geographical positions, corresponding environmental data, and/or other related characteristics of the race route and/or series of race route IDs). In the embodiment shown in FIG. 3C, column 326 shows a waypoint icon, name, and/or numerical identifier, column 328 shows a corresponding race route ID, column 330 shows a relative bearing of the current waypoint from the last waypoint (e.g., a routeleg bearing), a relative distance (e.g., a routeleg distance), and column 334 indicates whether a particular rounding characteristic (e.g., leave to starboard, or leave to port, when traversing from one routeleg to another at the designated waypoint) is associated with the waypoint and/or corresponding the routeleg(s), as described herein.

Once a user selects to finish or complete building the race route, user interface 120 may be configured to provide display view 300 of FIG. 3A to select the newly built route for display and/or navigation, for example, or user interface 120 may be configured to immediately display the newly built route or navigate according to the newly built route. In embodiments where user interface is configured to receive the race route IDs directly (e.g., without necessitating receiving user input of the IDs), user interface 120 may be configured to provide display view 302 to allow a user to verify the route before building and/or to apply various rounding characteristics, for example, or user interface 120 may be configured to provide display view 300 of FIG. 3A to select the newly received and built route for display and/or navigation or to immediately display the newly received and built route or navigate according to the newly received and built route.

In embodiments where a race route includes rounding characteristics (e.g., where the race organizers have designated a particular rounding characteristic to ensure safety and/or a minimum course distance, for example), user interface 120/controller 130 may be configured to display such rounding characteristics (e.g., if transmitted by route generator 210 and/or included in a racemark database) and/or accept user input selecting or adjusting a particular rounding characteristic corresponding to the waypoints and/or routelegs of the race route and/or corresponding race route IDs. As an example, FIGS. 4A-B illustrate various display views of a user interface 120 in accordance with embodiments of the disclosure.

Figure 4A:
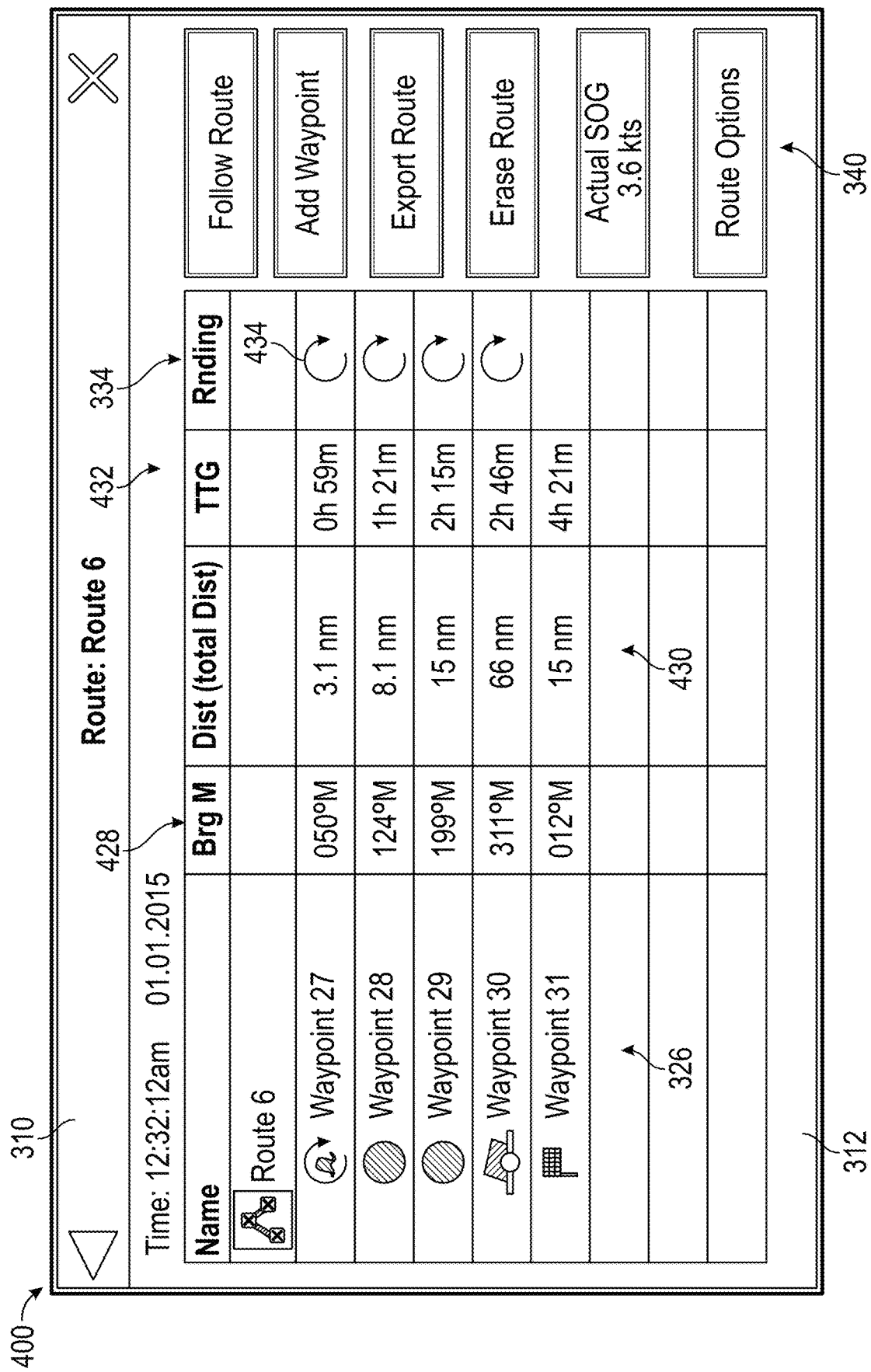
FIGS. 4A-C illustrate various display views of a user interface in accordance with embodiments of the disclosure.
Figure 4B:
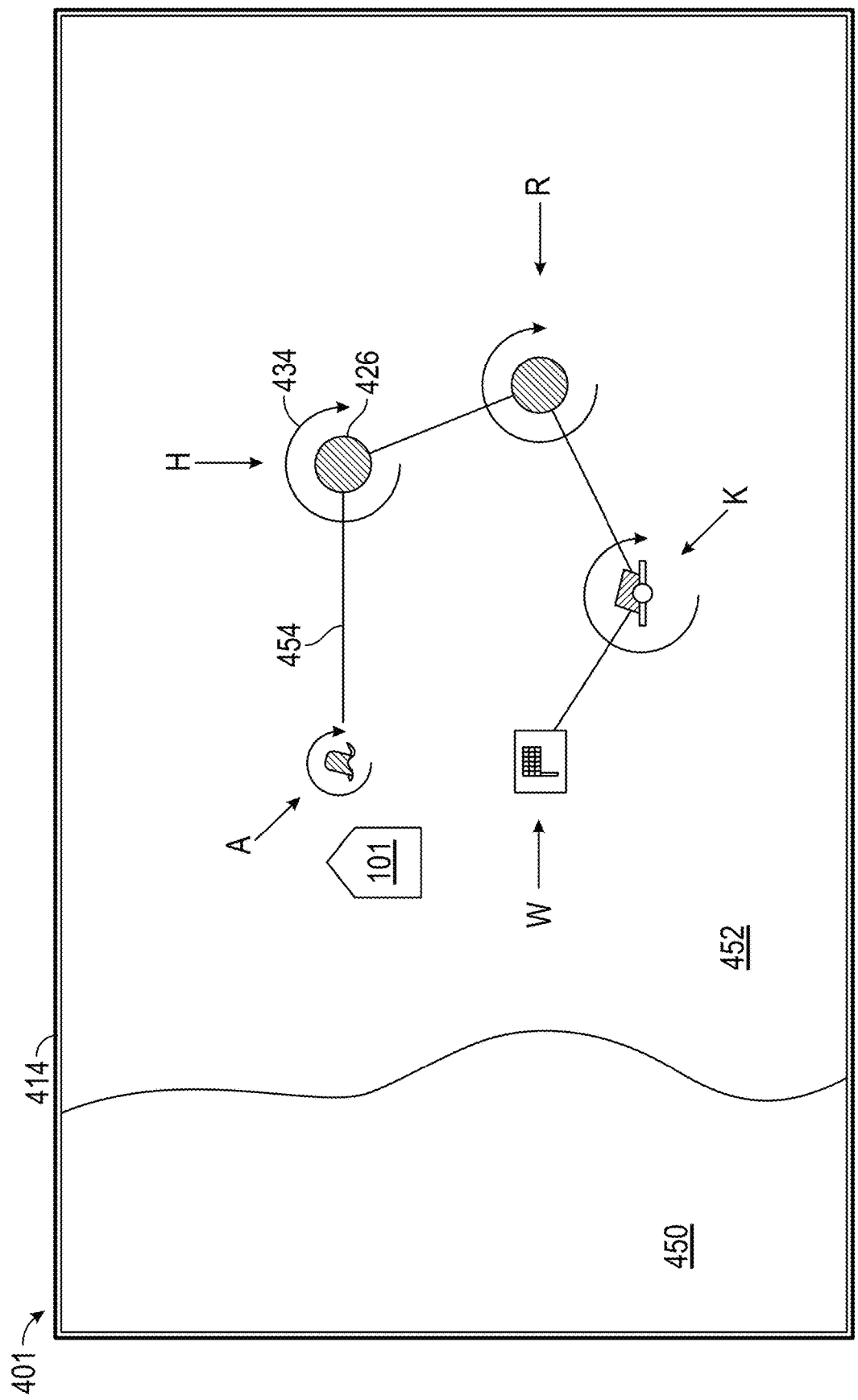

As shown in FIG. 4A, display view 400 includes header 310 and routing interface 312, which includes various route information interfaces/columns (e.g., columns 326, 428, 430, 432, 334) and user buttons 340 configured to provide information for a user to check the validity and/or other characteristics of the race route and the series waypoints and/or routelegs of the race route and adjust the race route or characteristics of the race route/waypoints/routelegs, initiate navigation (e.g., "Follow Route"), erase or export the route, and/or select other race route options.

In the embodiment shown in FIG. 4A, column 326 shows a waypoint icon, name, and/or numerical identifier, column 428 shows a relative bearing of either the current position to the next waypoint or the current waypoint from the last waypoint (e.g., a routeleg bearing), a relative distance to the next waypoint or between adjacent waypoints in the route (e.g., a routeleg distance), column 432 shows the time to get to the next waypoint (or estimated times between waypoints, or routeleg traversal times) based on a current speed over ground (SOG), and column 334 indicates whether a particular rounding characteristic 434 is associated with the waypoint and/or corresponding the routeleg(s), as described herein. As shown, each waypoint is associated with a clockwise (e.g., leave to starboard) rounding characteristic. Waypoint 31 is shown with no rounding characteristic because it is a finish line, and so does not need to be rounded to reach an additional routeleg.

In embodiments where a user selects to display a built race route (e.g., as shown in display view 300, or after selection of "Follow Route" in display view 400), user interface 120 may be configured to display a chart or map of the race route along with a position and/or orientation of mobile structure 101 to facilitate navigation of mobile structure 101. As an example, FIG. 4B illustrates display view 401 of user interface 120 in accordance with embodiments of the disclosure. In the embodiment shown in FIG. 4B, display view 401 includes navigational chart 414 (e.g., a view of routing interface 312), which shows land area 450, sea area 452, a position and/or heading of mobile structure 101, and a race route corresponding to the one designated in display views 3C and 4A including waypoints A, H, R, K, and W and corresponding waypoint symbols 426 and waypoint rounding indicators 434 (e.g., all shown as clockwise).

Figure 4C:
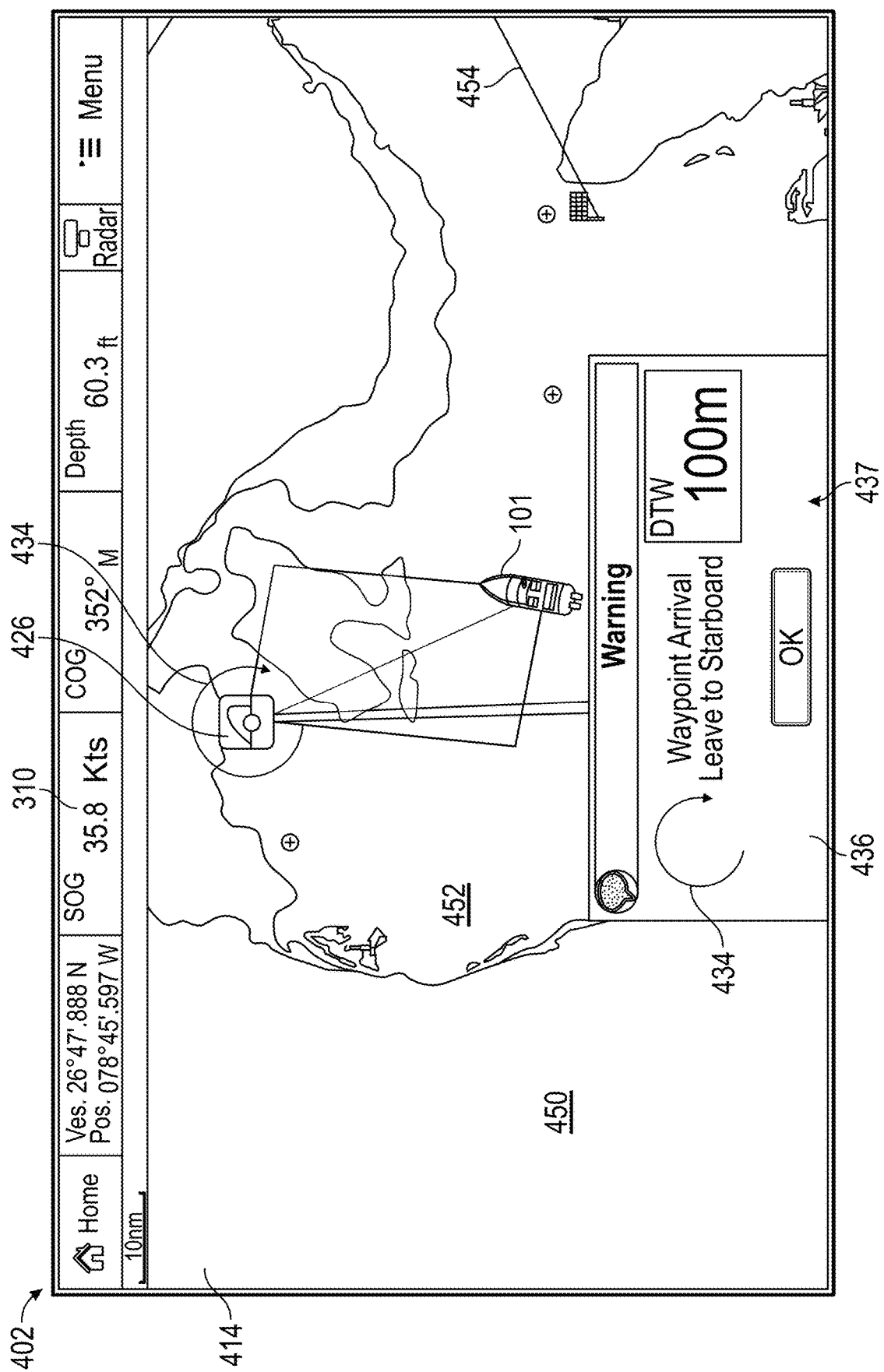

FIG. 4C illustrates display view 402 similar to display view 401 and including header 310 and navigational chart 414 with land area 450, sea area 452, an icon indicating position and/or orientation of mobile structure 101, waypoint symbol 426, waypoint rounding indicator 434, routelegs 454, and waypoint arrival notification 436. As shown, in some embodiments, waypoint arrival notification 436 may include an appropriate waypoint rounding indicator 434 and various route information corresponding to an approaching (e.g., the next) waypoint).

Figure 5A:
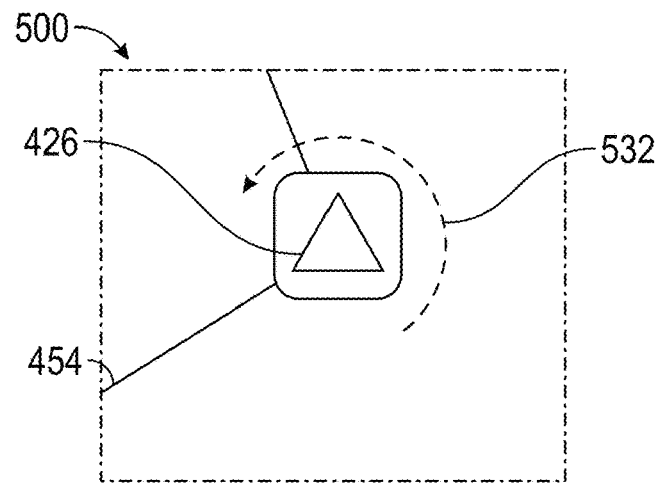
FIGS. 5A-G illustrate various waypoint rounding indicators for display by a user interface in accordance with embodiments of the disclosure.
Figure 5B:
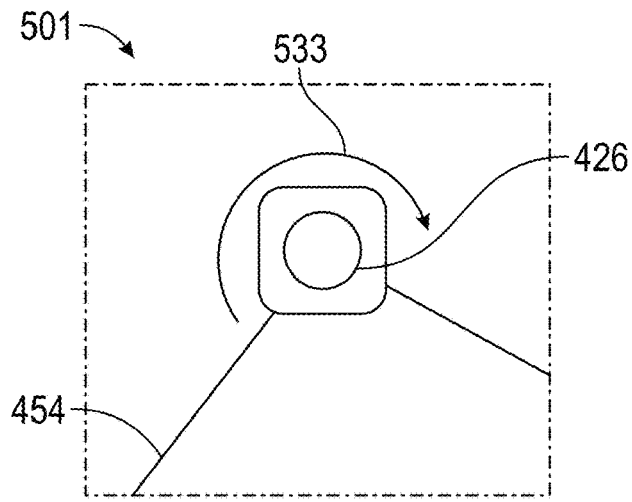
Figure 5C:
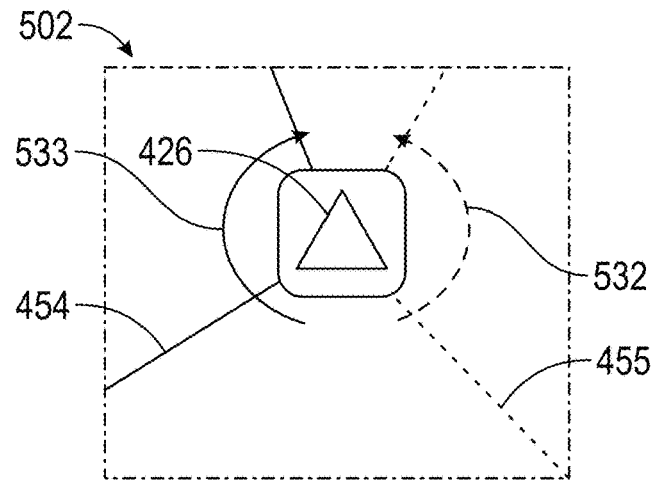
Figure 5D:
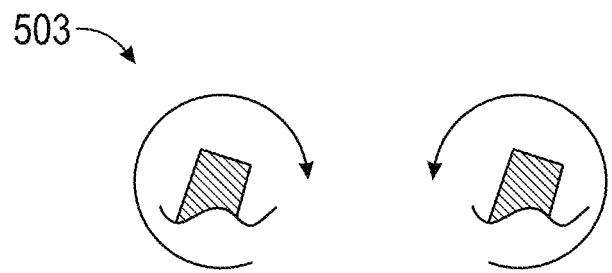
Figure 5E:
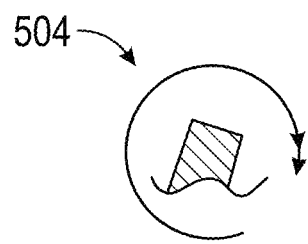
Figure 5F:
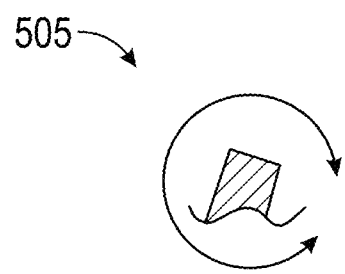
Figure 5G:
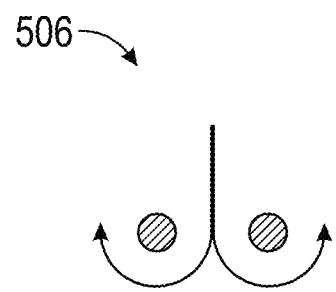

FIGS. 5A-G illustrate various waypoint rounding indicators for display by a user interface in accordance with embodiments of the disclosure. For example, display views 500, 501, and 502 of FIGS. 5A-C show waypoint symbols 426, routeleg symbols 454, counterclockwise waypoint rounding indicators 532, and clockwise waypoint rounding indicators 533. Waypoint rounding indicators may be differentiated by color (e.g., red for counterclockwise waypoint rounding indicators 532 and green for clockwise waypoint rounding indicators 533) in addition to or as an alternative to a graphical symbol indicating rounding direction. Also, as shown in FIG. 5C, a particular waypoint may have multiple non-connected routelegs associated with it (e.g., routelegs 455 are not connected to routeleg symbols 454 in FIG. 5C), and so that particular waypoint can be associated with two different types of rounding indicators/characteristics (e.g., to ensure mobile structures on routeleg symbols 454 do not collide with or cross paths of mobile structures on routelegs 455. Display view 503 of FIG. 5D shows an example of the same waypoint but with different rounding indicators, display view 504 of FIG. 5E shows an example of a waypoint symbol with a double rounding indicator (e.g., indicating a participant should round the waypoint twice, through use of double arrows or concentric arcs and arrows, for example), and display view 505 of FIG. 5E shows an example of a waypoint symbol that includes two possible (user or participant selectable) rounding characteristics indicated by an arc with opposite direction arrows. Display view 506 of FIG. 5G shows an example of a gate waypoint symbol that includes two possible (user or participant selectable) rounding characteristics indicated by a double fish hook type rounding indicator.

Figure 6:
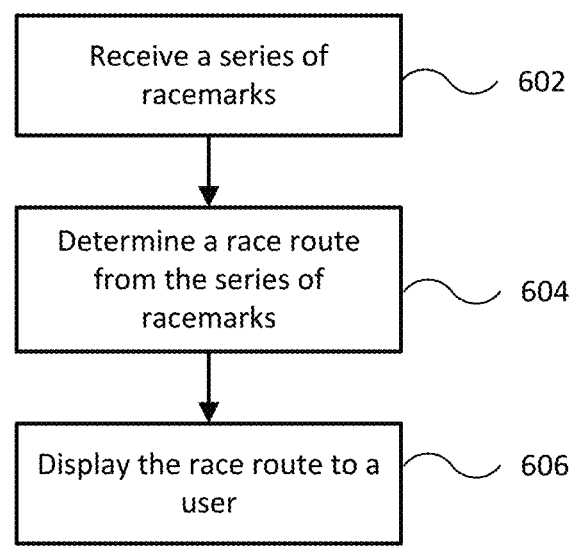
FIG. 6 illustrates a flow diagram of various operations to provide a race route distribution in accordance with an embodiment of the disclosure.

FIG. 6 illustrates a flow diagram of process 600 to provide race route distribution, display, and/or navigation for mobile structure 101 in accordance with an embodiment of the disclosure. In some embodiments, the operations of FIG. 6 may be implemented as software instructions executed by one or more logic devices associated with corresponding electronic devices, sensors, and/or structures depicted in FIGS. 1A-C and 2. More generally, the operations of FIG. 6 may be implemented with any combination of software instructions and/or electronic hardware (e.g., inductors, capacitors, amplifiers, actuators, or other analog and/or digital components).

It should be appreciated that any step, sub-step, sub-process, or block of process 600 may be performed in an order or arrangement different from the embodiments illustrated by FIG. 6. For example, in other embodiments, one or more blocks may be omitted, and other blocks may be included. Furthermore, block inputs, block outputs, various sensor signals, sensor information, calibration parameters, and/or other operational parameters may be stored to one or more memories prior to moving to a following portion of a corresponding process. Although process 600 is described with reference to systems 100, 100B, 100C, and/or 200 and/or display views in FIGS. 3A-5G, process 600 may be performed by other systems different from those systems and display views different from those views, including a different selection of electronic devices, sensors, assemblies, mobile structures, mobile structure attributes, user interfaces, graphics, and/or graphics attributes.

At the initiation of process 600, various system parameters may be populated by prior execution of a process similar to process 600, for example, or may be initialized to zero and/or one or more values corresponding to typical, stored, and/or learned values derived from past operation of process 600, as described herein.

In block 602, a logic device receives a series of racemarks. For example, user interface 120 and/or controller 130 of system 100 may be configured to receive a series of racemarks from a route distribution server and/or as user input provided to user interface 120. Upon receipt of such racemarks, user interface 120 and/or controller 130 may be configured to generate, render, and/or display a routing interface comprising a route selection interface and/or one or more route information interfaces, corresponding to the various display views described herein, to a user of mobile structure 101. In some embodiments, the series of racemarks may be implemented as a series of race route IDs to simplify entry, as described herein.

In other embodiments, user interface 120 and/or controller 130 may be configured to receive a racemark database prior to receiving the series of racemarks to facilitate converting race route IDs to waypoints and/or coordinate positions. In such embodiments, the racemark database may be received from a route distribution server and/or be received as user input provided to user interface 120.

In block 604, a logic device determines a race route from a series of racemarks. For example, user interface 120 and/or controller 130 may be configured to determine a race route, such as that shown in FIG. 4B, from the series of racemarks received in block 602. In some embodiments, user interface 120 and/or controller 130 may be configured to determine one or more routeleg bearings, routeleg distances, routeleg traversal times, rounding characteristics, and/or other route information associated with the determined race route and display a routing interface comprising one or more route information interfaces corresponding to the determined one or more routeleg bearings, routeleg distances, routeleg traversal times, rounding characteristics, and/or other route information to the user of the mobile structure.

In block 606, a logic device displays a race route to a user. For example, user interface 120 and/or controller 130 may be configured to display the race route determined in block 604 to a user of mobile structure 101. In some embodiments, user interface 120 and/or controller 130 may be configured to display the race route in a navigational chart comprising a plurality of waypoint symbols, routeleg symbols, and/or waypoint rounding indicators configured to graphically show a clockwise and/or counterclockwise rounding characteristic for at least one waypoint symbol on the navigational chart. Such race route and/or associated data may also be used to adjust various operational systems of mobile structure 101, including to autopilot the mobile structure.

It is contemplated that any one or combination of methods to provide race route distribution, display, and/or navigation may be performed according to one or more operating contexts of a control loop, for example, such as a startup, learning, running, and/or other type operating context. For example, process 600 may proceed back to block 602 and proceed through process 600 again to produce updated display views and/or imagery, as in a control loop. In some embodiments, updates to a race route may be provided after a race has begun, for example, and user interface 120 and/or controller 130 may be configured to add, delete, and/or swap racemarks by receiving and updated series of racemarks, for example, or through user input (e.g., by entering an existing race route ID and a new race route ID in a racemark swap interface similar to ID series display 324 of FIG. 3B (e.g., an option for routing interface 312).

Embodiments of the present disclosure can thus provide an intuitive user interface and facilitate race route distribution and generation and display of corresponding data and/or imagery. Such embodiments may be used to assist in navigation of a mobile structure and/or to assist in the operation of other systems, devices, and/or sensors coupled to the mobile structure.

Figure 7:
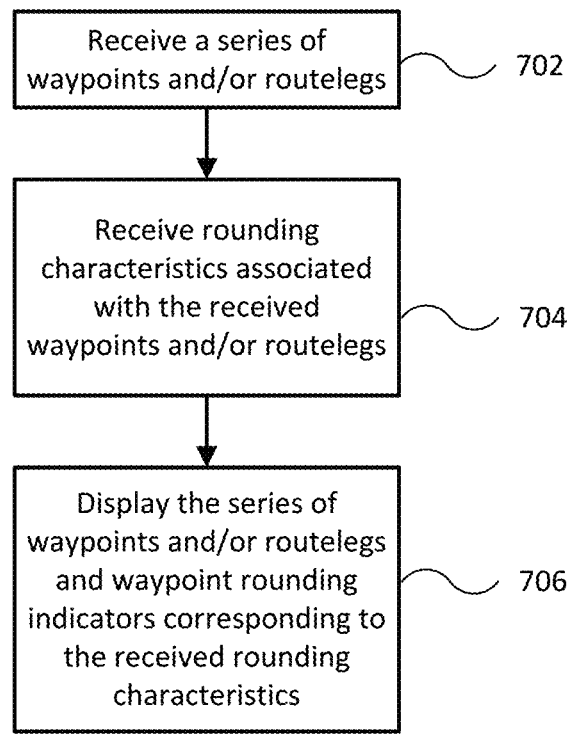
FIG. 7 illustrates a flow diagram of various operations to provide waypoint rounding indication in accordance with an embodiment of the disclosure.

FIG. 7 illustrates a flow diagram of process 700 to provide waypoint rounding indication for mobile structure 101 in accordance with an embodiment of the disclosure. In some embodiments, the operations of FIG. 7 may be implemented as software instructions executed by one or more logic devices associated with corresponding electronic devices, sensors, and/or structures depicted in FIGS. 1A-C and 2. More generally, the operations of FIG. 7 may be implemented with any combination of software instructions and/or electronic hardware (e.g., inductors, capacitors, amplifiers, actuators, or other analog and/or digital components).

It should be appreciated that any step, sub-step, sub-process, or block of process 700 may be performed in an order or arrangement different from the embodiments illustrated by FIG. 7. For example, in other embodiments, one or more blocks may be omitted, and other blocks may be included. Furthermore, block inputs, block outputs, various sensor signals, sensor information, calibration parameters, and/or other operational parameters may be stored to one or more memories prior to moving to a following portion of a corresponding process. Although process 700 is described with reference to systems 100, 100B, 100C, and/or 200 and/or display views in FIGS. 3A-5G, process 700 may be performed by other systems different from those systems and display views different from those views, including a different selection of electronic devices, sensors, assemblies, mobile structures, mobile structure attributes, user interfaces, graphics, and/or graphics attributes.

At the initiation of process 700, various system parameters may be populated by prior execution of a process similar to process 700, for example, or may be initialized to zero and/or one or more values corresponding to typical, stored, and/or learned values derived from past operation of process 700, as described herein.

In block 702, a logic device receives a series of waypoints and/or routelegs. For example, user interface 120 and/or controller 130 of system 100 may be configured to receive a series of waypoints and/or routelegs from a route distribution server and/or as user input provided to user interface 120. Upon receipt of such waypoints and/or routelegs, user interface 120 and/or controller 130 may be configured to generate, render, and/or display a routing interface comprising one or more route information interfaces to a user of the mobile structure. In some embodiments, the series of waypoints and/or routelegs may be implemented as a series of race route IDs to simplify entry, as described herein.

In other embodiments, user interface 120 and/or controller 130 may be configured to receive a racemark database prior to receiving the series of waypoints and/or routelegs to facilitate converting race route IDs to waypoints, routelegs, and/or coordinate positions. In such embodiments, the racemark database may be received from a route distribution server and/or be received as user input provided to user interface 120.

In block 704, a logic device receives rounding characteristics associated with received waypoints and/or routelegs. For example, user interface 120 and/or controller 130 may be configured to receive rounding characteristics associated with waypoints and/or routelegs received in block 702. In some embodiments, user interface 120 and/or controller 130 of system 100 may be configured to receive rounding characteristics from a route distribution server and/or as user input provided to user interface 120, similar to race route IDs as described herein. Upon receipt of such rounding characteristics, user interface 120 and/or controller 130 may be configured to generate, render, and/or display a routing interface comprising one or more route information interfaces to a user of the mobile structure. In some embodiments, the rounding characteristics may be included in a racemark database, which may be received prior to or as part of receiving the rounding characteristics, as described herein. In such embodiments, the racemark database may be received from a route distribution server and/or be received as user input provided to user interface 120.

In block 706, a logic device displays a series of waypoints and/or routelegs and waypoint rounding indicators corresponding to received rounding characteristics. For example, user interface 120 and/or controller 130 may be configured to display the series of waypoints and/or routelegs received in block 702 and waypoint rounding indicators, corresponding to the rounding characteristics received in block 704, to a user of mobile structure 101. In some embodiments, user interface 120 and/or controller 130 may be configured to display the series of waypoints and/or routelegs and waypoint rounding indicators as a navigational chart comprising a plurality of waypoint symbols, wherein the waypoint rounding indicators are configured to graphically show a clockwise and/or counterclockwise rounding characteristic for at least one waypoint symbol on the navigational chart. Such race route and/or associated data may also be used to adjust various operational systems of and/or autopilot mobile structure 101.

In some embodiments, user interface 120 and/or controller 130 may be configured to display waypoint rounding indicators as part of waypoint arrival notifications (e.g., as mobile structure 101 nears one of the waypoints shown in FIG. 4B, for example). In embodiments where a waypoint symbol (e.g., as selected by a race organizer, for example) includes an inherent rounding characteristic, user interface 120 and/or controller 130 may be configured to automatically select the appropriate rounding characteristic for display. In embodiments where a rounding characteristic is associated with a routeleg rather than a particular waypoint (e.g., at a junction between two routelegs), the waypoint symbol may be changed and/or its position moved by a user without changing the rounding characteristic for that junction in the race route. Examples of waypoint arrival notifications are provided in FIGS. 4B through 5G.

It is contemplated that any one or combination of methods to provide race route distribution, display, and/or navigation may be performed according to one or more operating contexts of a control loop, for example, such as a startup, learning, running, and/or other type operating context. For example, process 700 may proceed back to block 702 and proceed through process 700 again to produce updated display views and/or imagery, as in a control loop.

Embodiments of the present disclosure can thus provide an intuitive user interface and facilitate race route display to a user/operator of a mobile structure. Such embodiments may be used to assist in navigation of a mobile structure and/or to assist in the operation of other systems, devices, and/or sensors coupled to the mobile structure.

In some embodiments, it can be beneficial to provide a simplified method or process to extend an established route for autopiloting a mobile structure, particularly when operating a mobile structure while underway. In general, there are two prevalent ways to direct an autopiloted vessel to a destination: a "GoTo" process that terminates the current route and designates/reassigns the current waypoint/routeleg to a selected endpoint, or a "route build" process that initiates a full route building process. Marine navigators can use a GoTo to initiate navigation via a single route leg to a chosen destination. This can be quick to initiate and can be done without entering a route building mode, specifying a start point/route name, acknowledging message boxes, etc. Alternatively an operator may construct a multi-leg route from his present position to his chosen destination, but this is typically a much more involved and detailed operation and is seldom done on the fly due to the safety risks associated with lack of operational awareness (e.g., distracted user/operator, monopolization of the navigational user interface while underway).

When building a route, an operator is forced to think through the whole passage in one continuous task. The display is typically in a special "route build" mode and multiple options/acknowledgements are presented. In practice, even if a particular passage involves turns and multiple routelegs, operators often choose expediency over safety and perform a series of independent GoTos in order to avoid the chore of building a proper route. Using multiple, separate single leg GoTos means the operator can make a series of immediate decisions when in context and can see the situation/conditions/navigation options live. However, by using such series of Gotos, the operator must stop and restart active navigation each time the GoTo is selected, or re-specify the destination of the current GoTo, at the point at which it is relevant to do so. This requires the operator to be at the user interface at each change in direction, which can be burdensome to the time and attention of the operator, and can create an unsafe situation while the navigation system is inactive.

Embodiments of the present disclosure address these issues by providing a simple and convenient specification a subsequent destination (also referred to as an extended route) at any point during the current navigation. For example, in various embodiments, specifying an extended route can be performed using a two separate key presses (e.g., separate and/or distinct user selections or inputs provided to a user interface). In some embodiments, an operator that is navigating an established route (e.g., a fully built route or a single GoTo routeleg) may add a routeleg (or multiple routelegs) onto the end of the established route at any point while underway along the established route. This may be referred to as a "GoNext" process. In various embodiments, a GoNext process, also referred to as a simplified route extension process, may be a single or two part action that can be carried out at any time that an established route (e.g., a full "route build" route or a GoTo route) exists and is as simple as selecting a position on a navigational chart and selecting "GoNext" in a popup contextual menu associated with the selection of the position on the navigational chart. Using such methods, an operator of a mobile structure can define a multi-leg extended route in a minimum of keypresses while in active navigation and at any point along an established route, and can do so while avoiding entering a relatively complex and distracting "route build" mode.

In one embodiment, the process may proceed as follows. A user/operator may select a destination on a navigational chart (e.g., a map, a sonar chart, a radar image, and/or other navigational data and/or combinations of navigational data displayed on user interface 120) and then select a "Goto" function to establish a single leg route. The navigation system (e.g., systems 100, 100B, 100C, and/or 200 of FIGS. 1A-2) may respond by marking the selected position as the destination of the single leg route. The navigation system/ user display 120 may then enter a "navigation mode" in which course corrections/control signals are provided to steering sensor/actuator 150 and/or propulsion system 170 to follow the single leg route; distance/time of arrival data, etc. are calculated and displayed to the operator; and the endpoint and course to travel are displayed on the navigational chart.

At this point, the single leg route may be extended by the operator by specifying a subsequent destination after the established destination. This may be achieved by selecting a position on the navigational chart and selecting a "GoNext" process (e.g., in an associated contextual menu displayed over or next to the navigational chart) to determine the extended route. After adding the "GoNext" position to the end of the established single leg route, user interface 120 may remove the associated contextual menu and continue in the "navigation mode" (i.e. user interface 120 does not enter a more involved route building mode or state). The operator may add multiple such "GoNext" positions at any point during active navigation. In some embodiments, according to a configuration setting, the GoTo and GoNext functions may create permanent waypoints (e.g., waypoints that are stored in non-volatile memory for future use) or temporary waypoints that only exist while traversing the established or extended route and/or during the current navigation process.

Figure 8A:
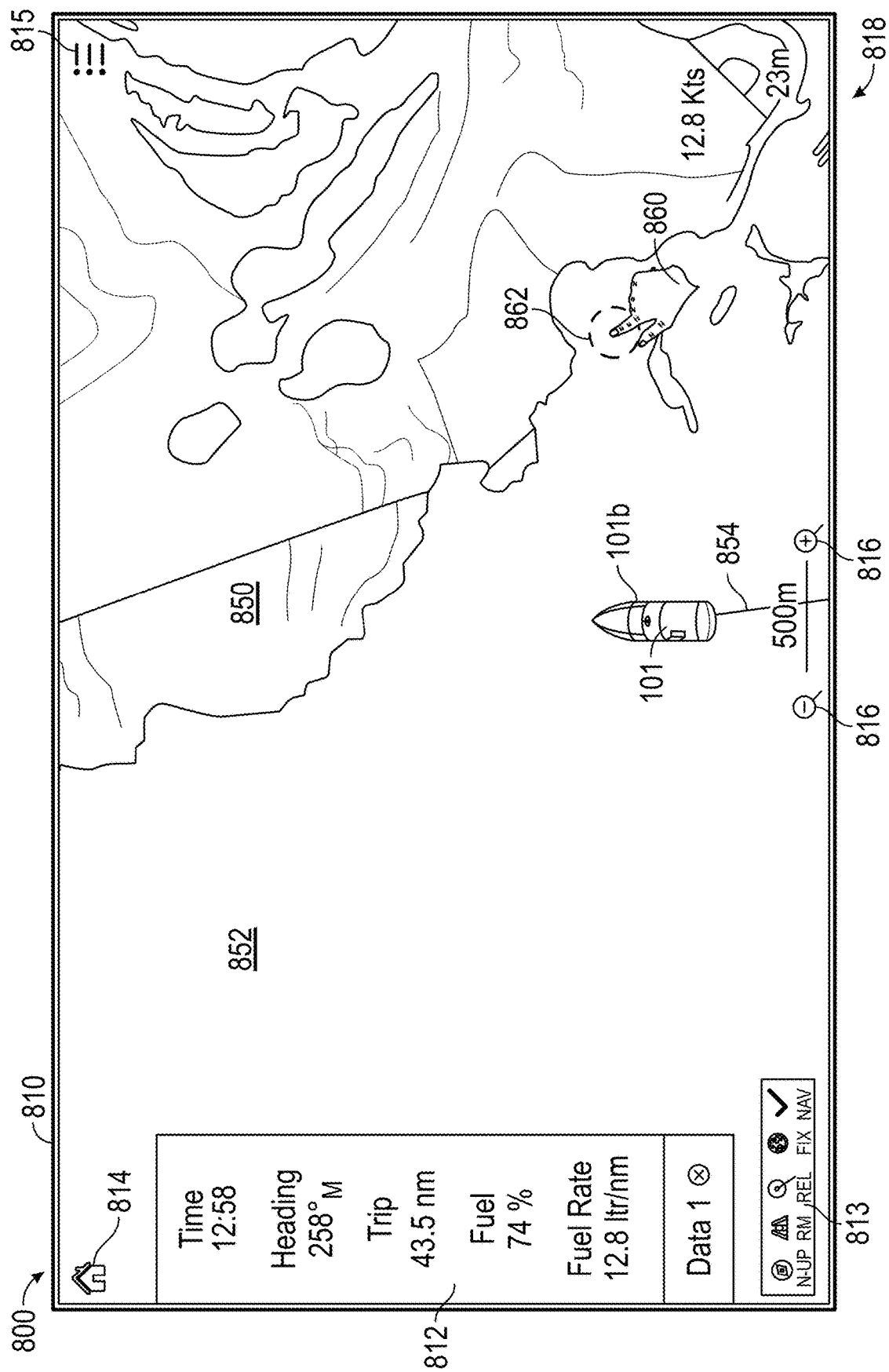
FIGS. 8A-F illustrate a series of operations to provide simplified route extension using a user interface in accordance with embodiments of the disclosure.

FIGS. 8A-F illustrate a series of operations to provide simplified route extension using a user interface in accordance with embodiments of the disclosure. In particular, FIG. 8A shows display view 800 of user interface 120, which may correspond to a first step in establishing a single leg route. As shown in FIG. 8A, display view 800 includes navigational chart 810, which shows land area 850, sea area 852, a position and/or heading of mobile structure 101 (e.g., using a mobile structure indicator 101b as shown in FIG. 8A), established routeleg 854, and various user selectable contextual menus, buttons, and/or navigational data 812-816 and 818, as shown. Such user selectable contextual menus, buttons, and/or navigational data 812-816 and 818 may be rendered with varying transparency with respect to navigational chart 810 in order to facilitate active navigation and situational awareness, for example. Also shown are user selector 860 and selection indicator 862 indicating a position on navigational chart 810 selected by selector 860. In various embodiments, display view 800 may correspond to a navigation mode of user interface 120, for example, and mobile structure 101 may be navigating along routeleg 854 or at an endpoint of routeleg 854.

Navigational chart 810 may be a cartographical map, a satellite image, a bathymetric chart, a radar image or chart, and/or other type of navigational chart comprising one or more various types of navigational data and/or combinations of data configured to facilitate navigation of mobile structure 101 across, within, or around sea area 852 and/or land area 850. Selector 860 may correspond to a computer mouse, track pad, joystick, or other electronic user input, for example, or a stylus, human finger, or other mechanical user input provided to a touch screen display of user interface 120. While user interface 120 is in a navigation mode, contextual menu 812 may be configured to display various types of navigational data associated with operation of mobile structure 101, as shown, and/or to indicate user selection of a position at selection indicator 862 (e.g., "Data 1"). More generally, system 100 may be configured to detect and/or receive user input by selector 860 indicating a position (e.g., indicated by selection indicator 862) on navigational chart 810.

Figure 8B:
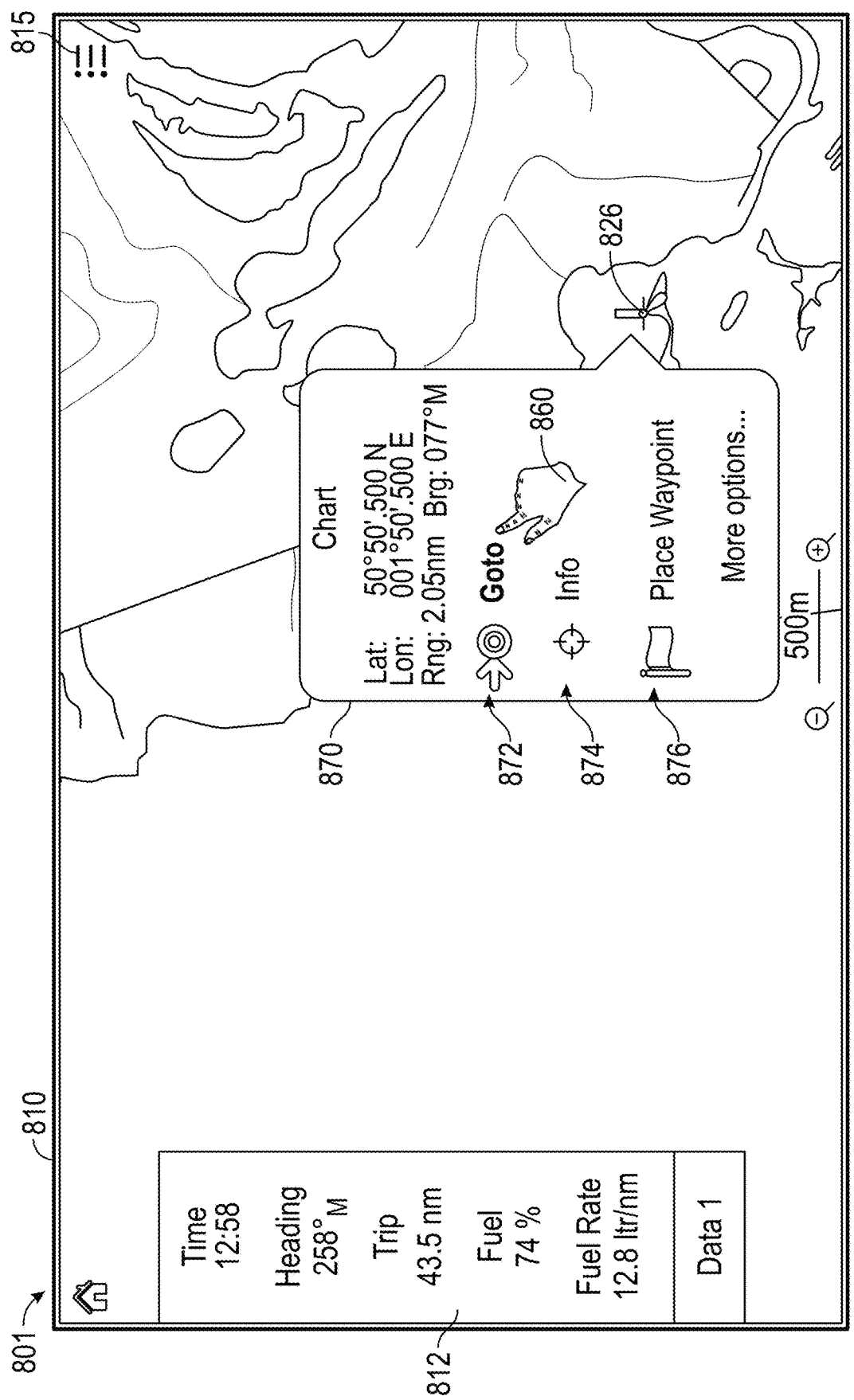

FIG. 8B shows display view 801 of user interface 120, which may correspond to a second step in establishing a single leg route. For example, system 100 may be configured to render popup contextual menu 870 corresponding to the position selected by selector 860 in FIG. 8A and receive user input by selector 860 of a button on menu 870. In some embodiments, popup contextual menu 870 may include a single leg route button 872 (e.g., a GoTo button) and various other user selectable buttons, such as information button 874 (e.g., to retrieve information about one or more navigational objects within/near selection indicator 862) and place waypoint button 876 (e.g., to create a new waypoint). Also shown is selection symbol 826, which may be configured to indicate the type of navigational object, rounding characteristics, and/or other characteristics of the navigational object at the selected position, as described herein. In FIG. 8B, selector 860 is shown selecting single leg route ("GoTo") button 872 to establish a single leg route, as shown in FIG. 8C.

Figure 8C:
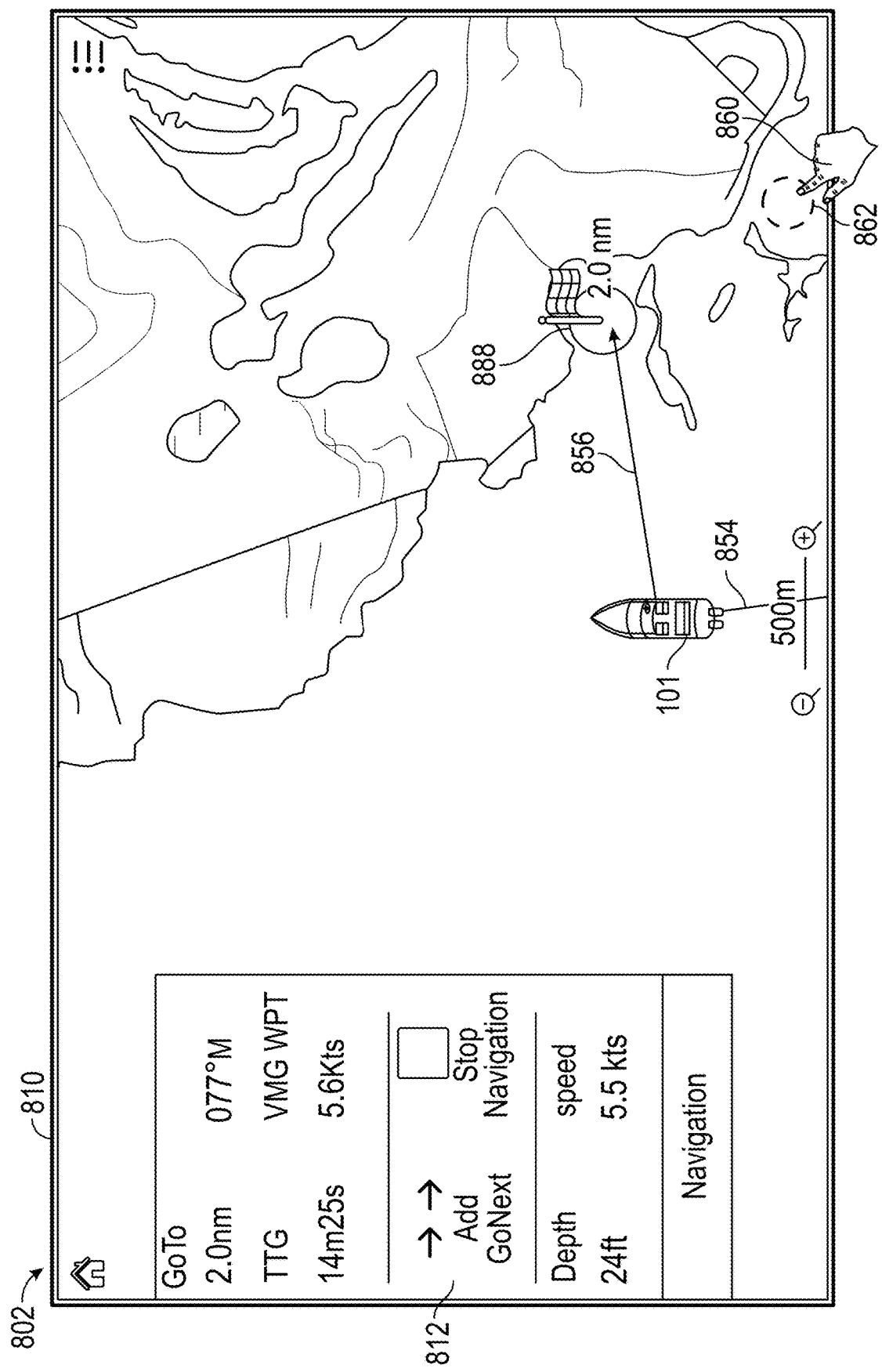

FIG. 8C shows display view 802 of user interface 120, which may correspond to a first step in extending an established route. For example, system 100 may be configured to receive user input by selector 860 indicating a position (e.g., indicated by selection indicator 862) on navigational chart 810. As shown in FIG. 8C, display view 802 includes an established route (e.g., a single leg route consisting of routeleg 856 established in FIGS. 8A-B, or a multi-leg route including established routelegs 854 and 856) terminating at endpoint 888 (e.g., as indicated by an endpoint symbol, as shown). In some embodiments, contextual menu 812 in display view 802 may be configured to show navigational data and user selectable options corresponding to the established route (e.g., a multi-leg route and/or a single leg route), the display view, and/or a mode of user interface 120, including the option to extend the established route.

Figure 8D:
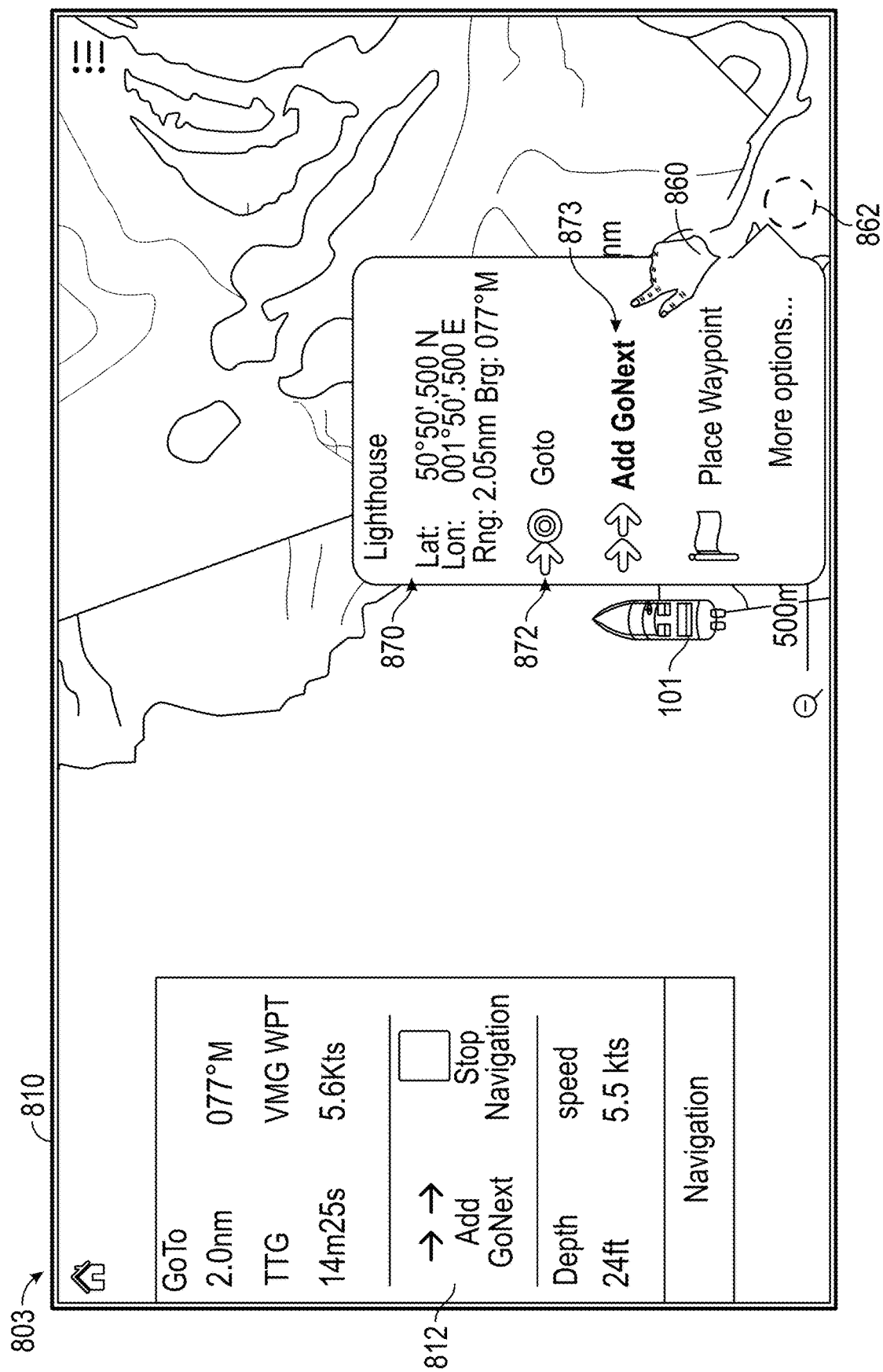

FIG. 8D shows display view 803 of user interface 120, which may correspond to a second step in extending an established route. For example, system 100 may be configured to render popup contextual menu 870 corresponding to the position selected by selector 860 in FIG. 8C and receive user input by selector 860 of a button on menu 870. In the embodiment shown in FIG. 8D, popup contextual menu 870 may include single leg route button 872, route extension button 873, and various other user selectable buttons. In FIG. 8D, selector 860 is shown selecting route extension button 873 to indicate the position received in display view 802 (e.g., indicated by selection indicator 862) corresponds to an extended route for mobile structure 101. In some embodiments, contextual menu 812 in display view 803 may be configured to show navigational data and user selectable options corresponding to the established route, the selected/ received position, the display view, and/or a mode of user interface 120.

Figure 8E:
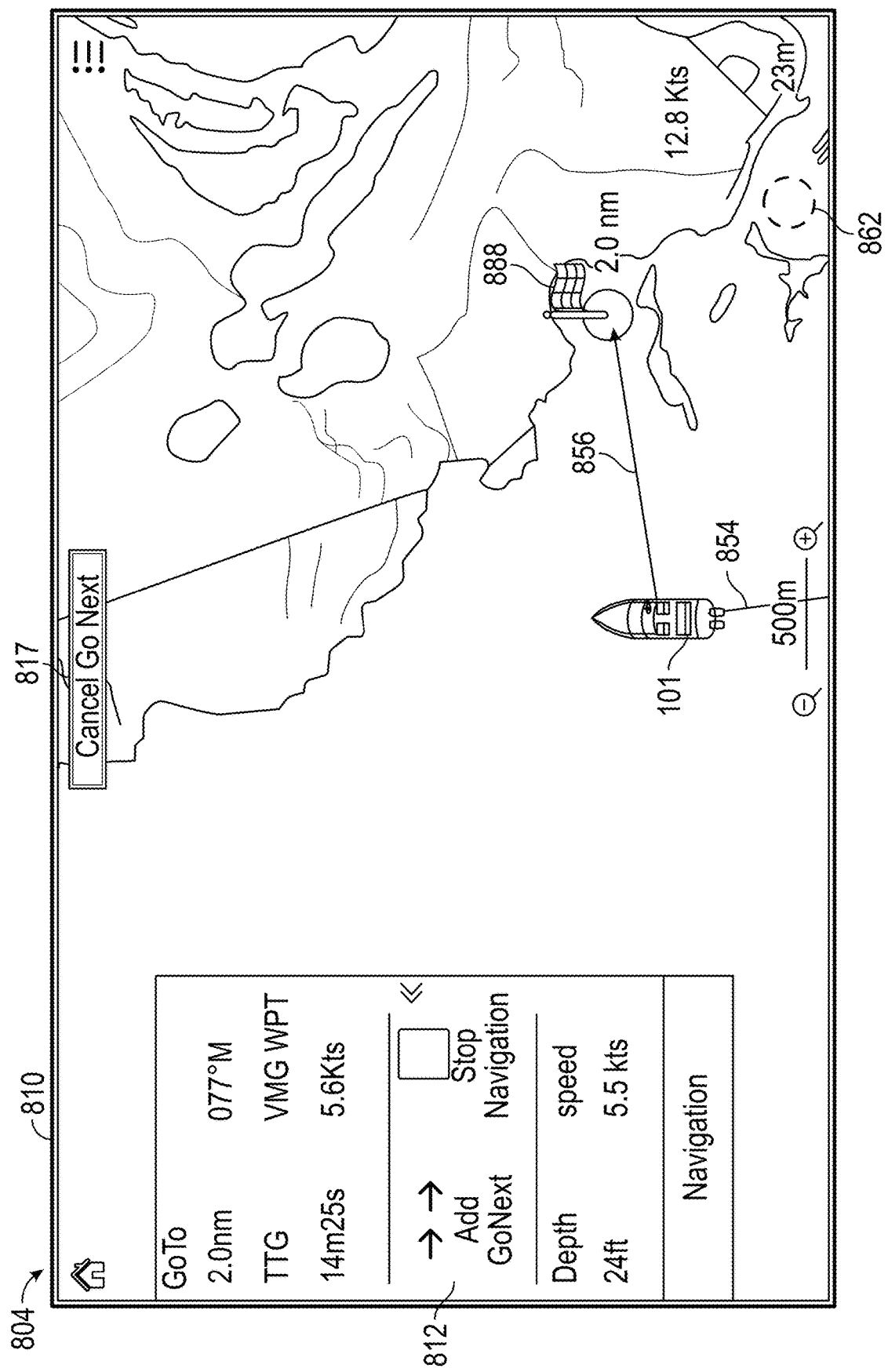

FIG. 8E shows display view 804 of user interface 120, which may correspond to an optional intermediate step in extending an established route. For example, system 100 may be configured to remove popup contextual menu 870 shown in display view 803 and render contextual menu/button 817 in display view 804 to allow a user/operator to cancel extending the established route before the established route is modified. In some embodiments, display view 804 including contextual menu/button 817 may be rendered for a preset time after user selection of route extension button 873 in display view 803. In other embodiments, display view 804 may be rendered by system 100 while system 100 is determining at least one extension routeleg to the position received in display view 802. In other embodiments, display view 804 may be omitted from a process for extending an established route. In some embodiments, contextual menu 812 in display view 804 may be configured to show navigational data and user selectable options corresponding to the established route, the selected/received position, the display view, and/or a mode of user interface 120.

Figure 8F:
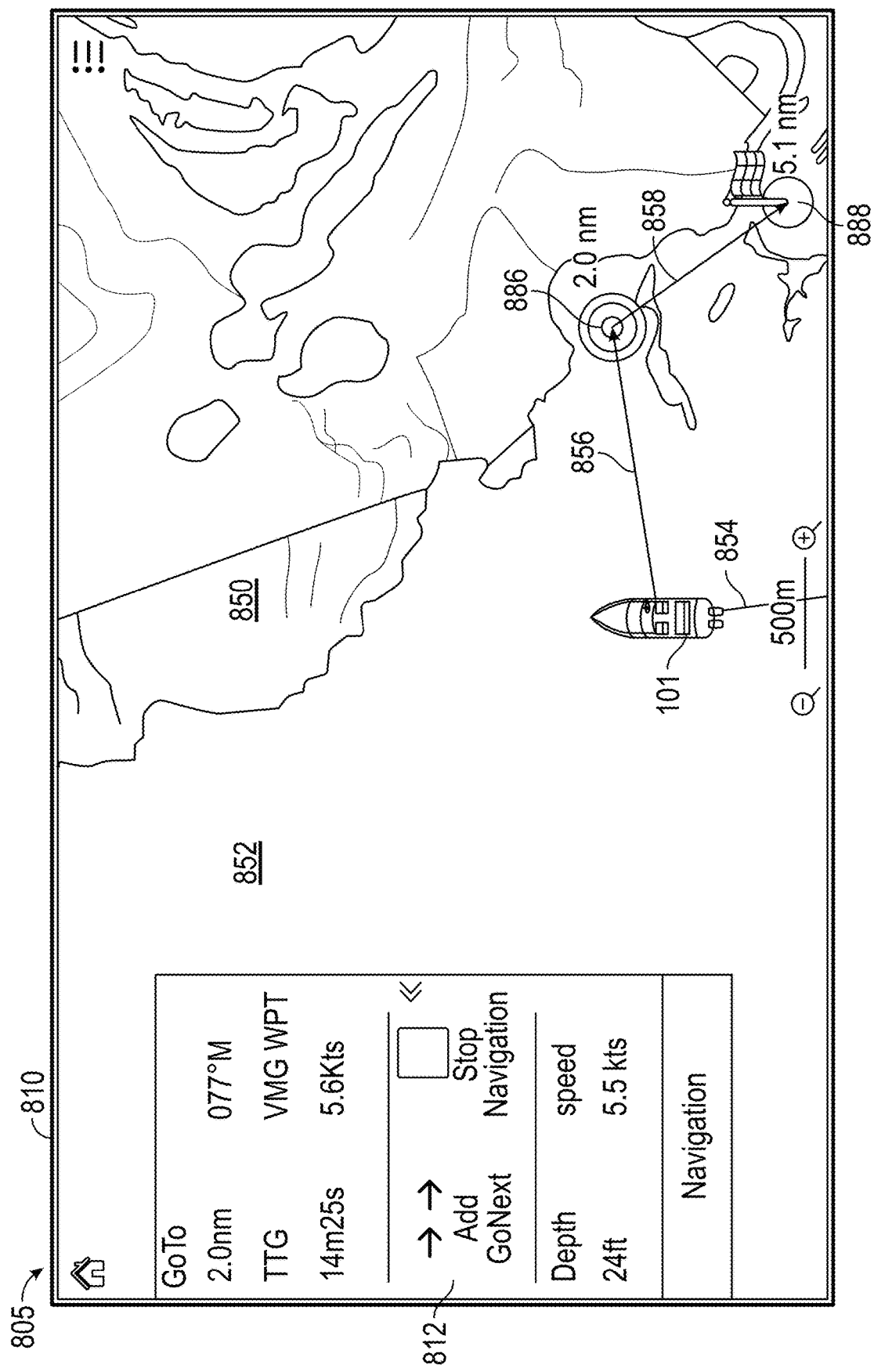

FIG. 8F shows display view 805 of user interface 120, which may correspond to a last step in extending an established route. Notably, display view 805 may be rendered on user interface 120 after only two user inputs (e.g., those depicted in display views 802 and 803), once a single leg or multi-leg route has been established. For example, system 100 may be configured determine extension routeleg 858 from the prior endpoint of the previously established route (e.g., indicated by waypoint 886) to the position received in viewpoint 802 (e.g., indicated by updated endpoint 888), and to render at least a portion of an extended route on navigational chart 810. As shown in FIG. 8F, the extended route may include extension routeleg 858, waypoint 886, routeleg 856, and, in some embodiments, routeleg 854. The process of the series of display views 802, 803, optional 804, and 805 may be repeated to extend the rendered route iteratively as needed, at any time while mobile structure 101 is traversing any of the depicted routelegs. Moreover, although the series of display views 800-805 are presented in the context of a single leg established route, the series of display views 802-805 may be used to extend a single or multi-leg established route, by a single extension routeleg or by multiple extension routelegs.

In various embodiments, the associated navigational system (e.g., systems 100, 100B, 100C, and/or 200) may be configured to automatically modify extension routeleg 858 to avoid navigational hazards depicted in navigational chart 810 and/or associated navigational data (e.g., radar data, sonar data, and/or other navigational data). For example, as shown in FIG. 8F, extension routeleg 858 is shown crossing portions of land area 850 (e.g., islands in sea area 852). The associated navigational system may be configured to modify extension routeleg 858 to include additional extension routelegs and corresponding extension waypoints to safely route around such detected navigational hazards and reach endpoint 888 of the extended route. Thus, embodiments of the present disclosure provide a relatively simplified, reliable, and accurate method to extend established routes used to autopilot a mobile structure.

Figures 1, 8G:
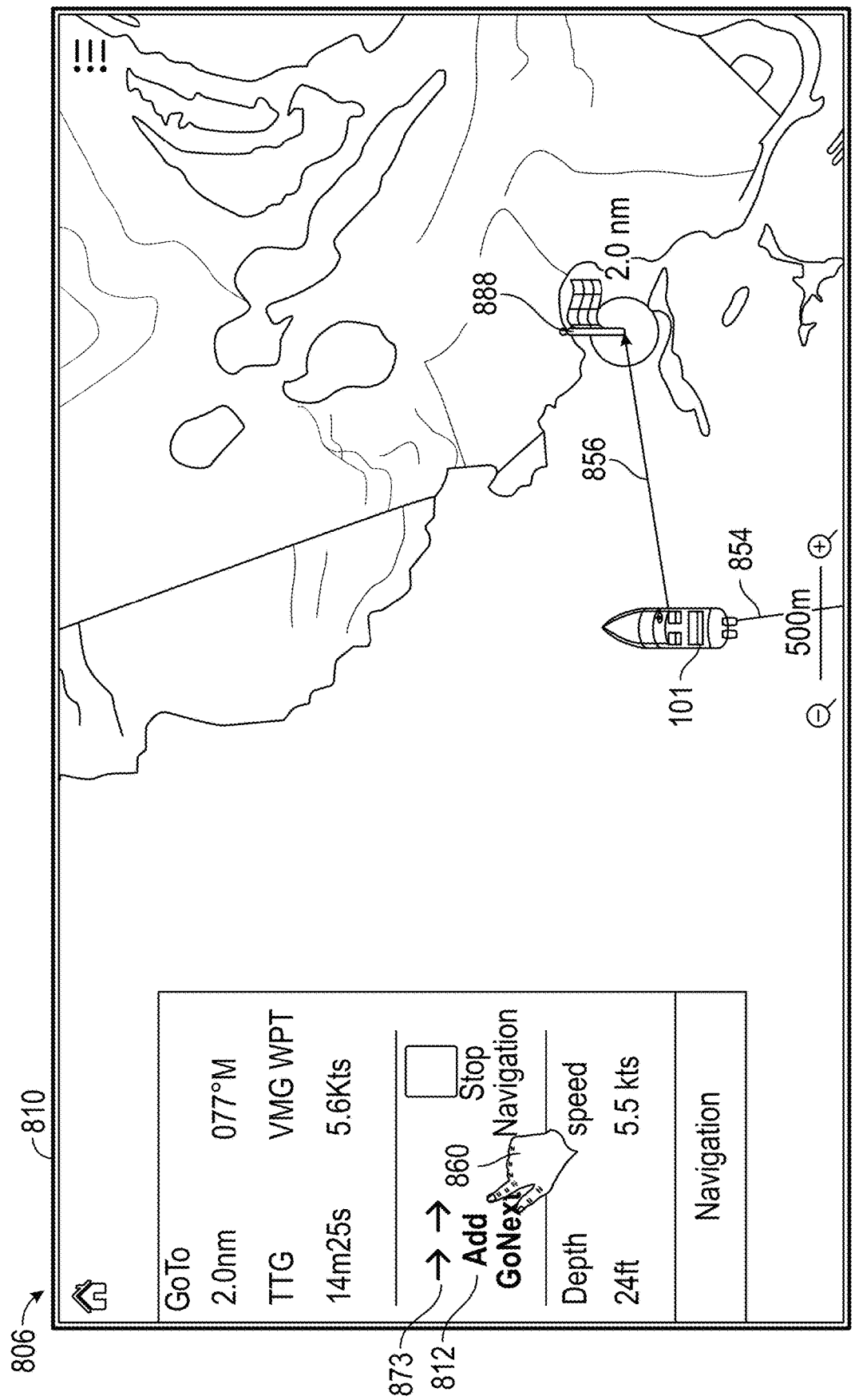
FIGS. 8G-1 through 8G-4 illustrate a series of operations to provide simplified route extension using a user interface in accordance with embodiments of the disclosure.
Figures 2, 8G:
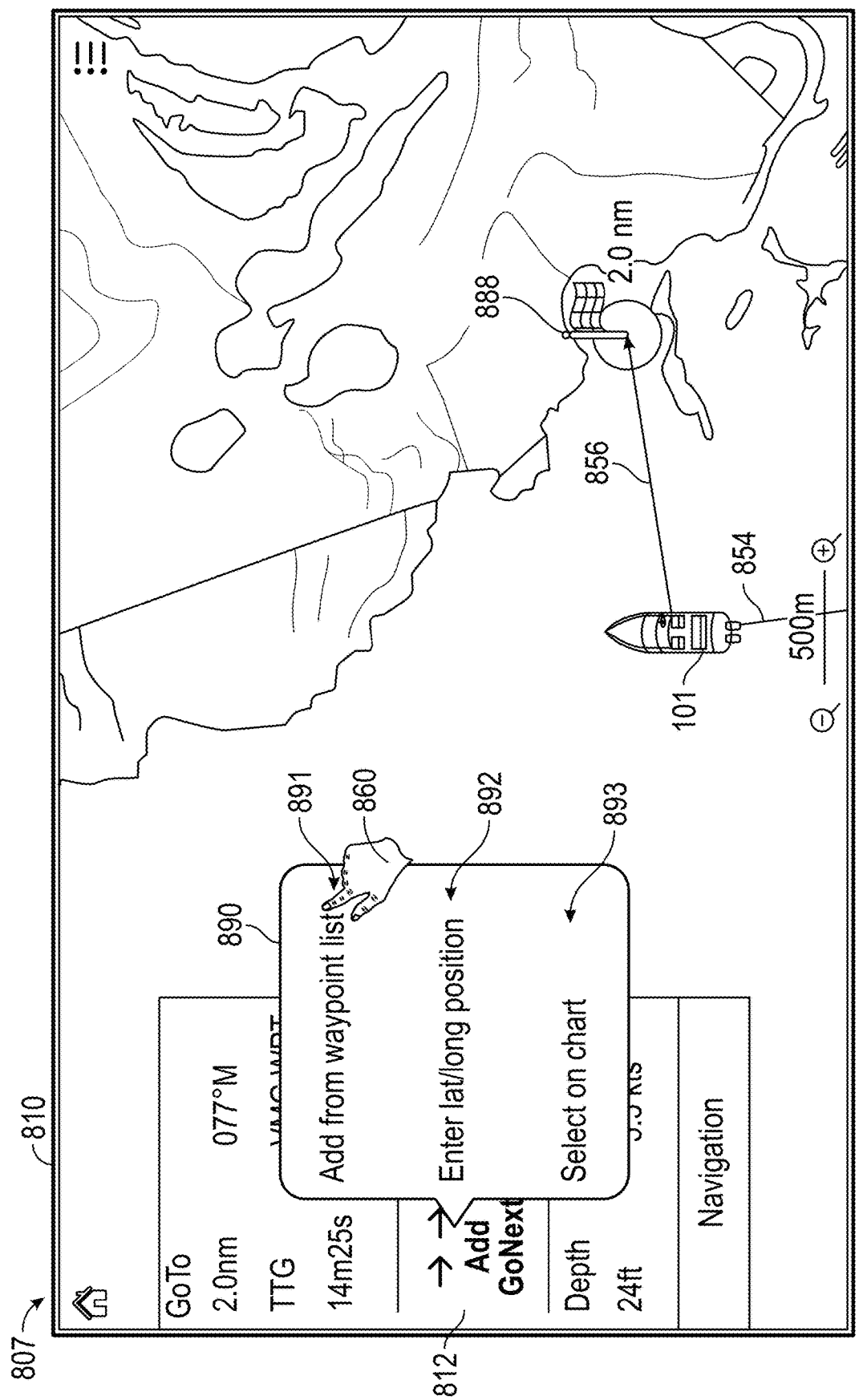
Figures 4, 8G:
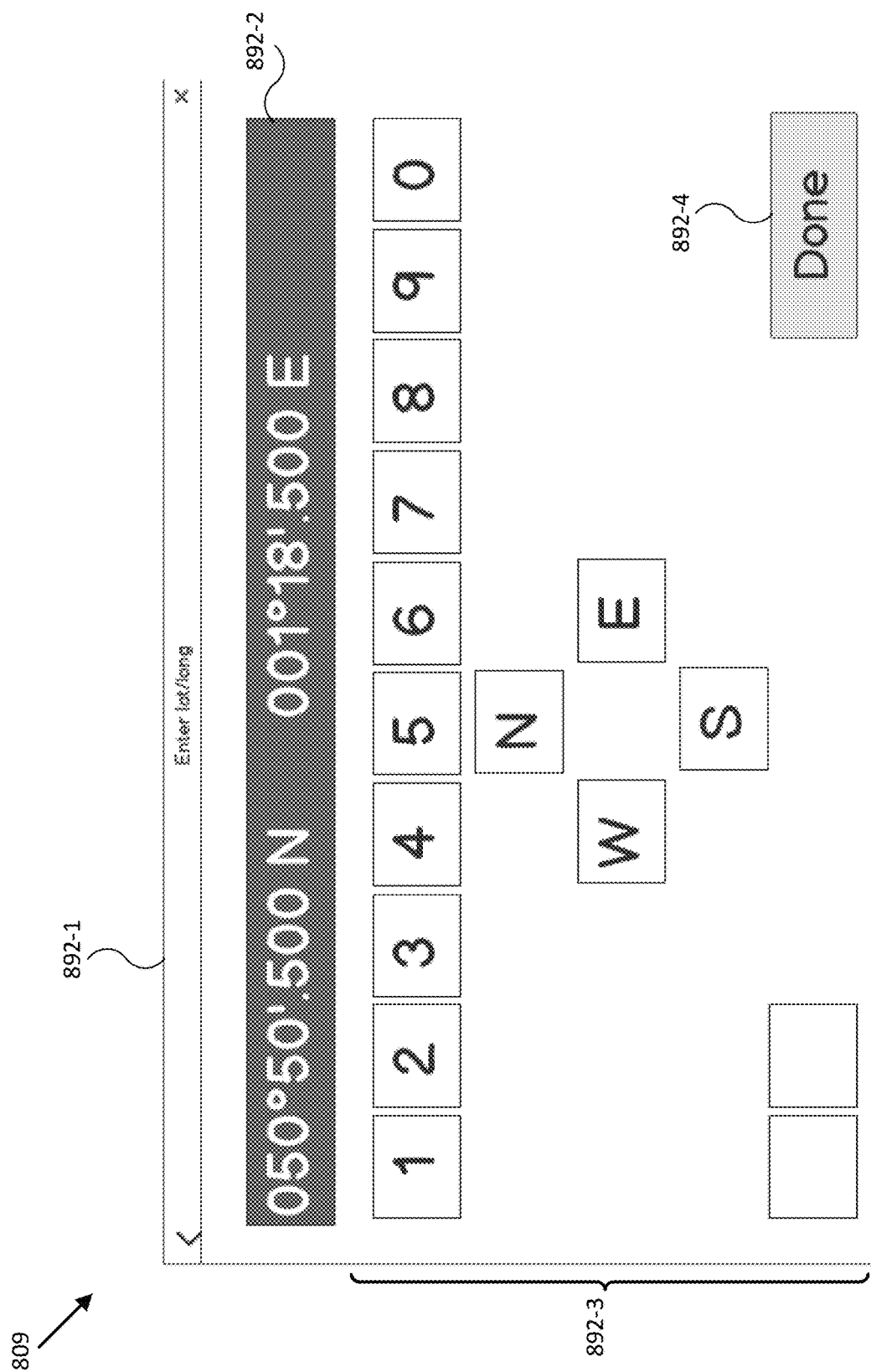

FIGS. 8G-1 through 8G-4 illustrate an alternative method to extend an established route, as compared to the method corresponding to FIGS. 8C-D (e.g., and optionally Fig. E). In particular, FIG. 8G-1 shows display view 806 of user interface 120, which may correspond to an alternative first step in extending an established route. As shown in FIG. 8G-1, display view 806 includes an established route (e.g., a single leg route consisting of routeleg 856 established in FIGS. 8A-B, or a multi-leg route including established routelegs 854 and 856) terminating at endpoint 888 (e.g., as indicated by an endpoint symbol, as shown). System 100 may be configured to render contextual menu 812 and receive user input by selector 860 of a button on contextual menu 812. For example, in the embodiment shown in FIG. 8G-1, contextual menu 812 may include route extension button 873 and various other user selectable buttons, and selector 860 is shown selecting route extension button 873 to indicate a desire to establish an extended route for mobile structure 101. In some embodiments, contextual menu 812 in display view 806 may also be configured to show navigational data and user selectable options corresponding to the established route (e.g., a multi-leg route and/or a single leg route), the display view, and/or a mode of user interface 120.

FIG. 8G-2 shows display view 807 of user interface 120, which may correspond to an alternative second step in extending an established route. For example, system 100 may be configured to render popup contextual menu 890 corresponding to route extension button 873 selected by selector 860 in FIG. 8G-1 and receive user input by selector 860 of a button on menu 890. In the embodiment shown in FIG. 8G-2, popup contextual menu 890 may include waypoint list button 891, position entry button 892, chart entry button 893, and/or various other user selectable buttons. In FIG. 8G-2, selector 860 is shown selecting waypoint list button 891 to indicate the position contemplated for an extended route for mobile structure 101 will be selected from a database or list of waypoints, such as display view 808 shown in FIG. 8G-3. In other embodiments, selector 860 may select position entry button 892 to indicate the position contemplated for an extended route for mobile structure 101 will be entered directly through the user interface, such as through use of display view 809 shown in FIG. 8G-4. In still further embodiments, selector 860 may select chart entry button 893 to indicate the position contemplated for an extended route for mobile structure 101 will be entered through user selection of a corresponding position on chart 810 displayed by a user interface, such as through use of a display view similar to display view 802 shown in FIG. 8C.

FIG. 8G-3 shows display view 808 of user interface 120, which may correspond to an optional third step in extending an established route. For example, system 100 may be configured to render waypoint list 891-1 and receive selection (e.g., by selector 860) of a particular waypoint in waypoint list 891-1. As shown in the embodiment presented by FIG. 8G-3, waypoint list 891-1 may include one or more user selectable columns, such as waypoint name column 891-2, waypoint relative position column 891-3, waypoint absolute position column 891-4, waypoint date column 891-5, and/or new waypoint button 891-6. Waypoint name column 891-2 may include a list of names for the listed waypoints, which may be grouped by date, area, and/or other grouping criteria, and optionally ordered (e.g., alphabetically) based on the groupings and/or names. Such grouping criteria and/or individual waypoint names may be user customizable, for example, so as to generate a more intuitive presentation of waypoints for selection by a particular user. Waypoint relative position column 891-3 may include a list of relative positions (e.g., relative heading or bearing and range) for the listed waypoints, which may be optionally ordered based on the relative positions, such as by increasing or decreasing relative heading or range. Waypoint absolute position column 891-4 may include a list of absolute positions (e.g., latitude and longitude) for the listed waypoints, which may be optionally ordered based on the absolute positions, such as by increasing or decreasing latitude or longitude. Waypoint date column 891-5 may include a list of dates corresponding the time and/or day a particular waypoint was added to waypoint list 891-1, for example, or was last accessed, which may be optionally ordered based on the dates, such as by increasing or decreasing time from generation of display view 808. New waypoint button 891-6 may be selected (e.g., by selector 860) to enter a new waypoint into waypoint list 891-1 directly through user interface 120, such as through use of a display view including a chart similar to display view 800 of FIG. 8A or display view 802 of FIG. 8C (e.g., where the new waypoint is entered by selection of a position on chart 810, for example), or through use of a display view similar to display view 809 shown in FIG. 8G-4 (e.g., where a new waypoint is entered by designation of an alphanumeric description of a position, for example).

FIG. 8G-4 shows display view 809 of user interface 120, which may correspond to an optional third step in extending an established route (e.g., upon selection of position entry button 892 in FIG. 8G-2), for example, or an optional fourth step extending an established route (e.g., upon selection of new waypoint button 891-6 in FIG. 8G-3). For example, system 100 may be configured to render position entry interface 892-1 and receive user input (e.g., by selector 860) indicating a particular position (e.g., corresponding to updated endpoint 888 of FIG. 8F) for an extended route for mobile structure 101 and/or for a new waypoint (e.g., for addition to waypoint list 891-1 in FIG. 8G-3). As shown in the embodiment presented by FIG. 8G-4, position entry interface 892-1 may include one or more feedback displays and/or user selectable buttons, such as position entry feedback display 892-2, position entry buttons 892-3, and/or position entry complete button 892-4. Position entry feedback display 892-2 may display position entries (e.g., corresponding to user selection of one or more of position entry buttons 892-3) as feedback to a user during position entry, position entry buttons 892-3 may receive user selections (e.g., through use of selector 860) of various alphanumerical position elements, and position entry complete button 892-4 may receive user selection indicating position entry (e.g., as displayed in position entry feedback display 892-2) is complete. Upon selection of position entry complete button 892-4, display view 805 of FIG. 8F may be displayed (e.g., corresponding to a last step in extending an established route), display view 808 of FIG. 8G03 may be displayed (e.g., with a new waypoint added to waypoint list 891-1), and/or one or more other display views may be displayed, by user interface 120. Thus, embodiments of the present disclosure provide a relatively simplified, reliable, accurate, and flexible method to extend established routes used to autotpilot a mobile structure.

Figure 9:
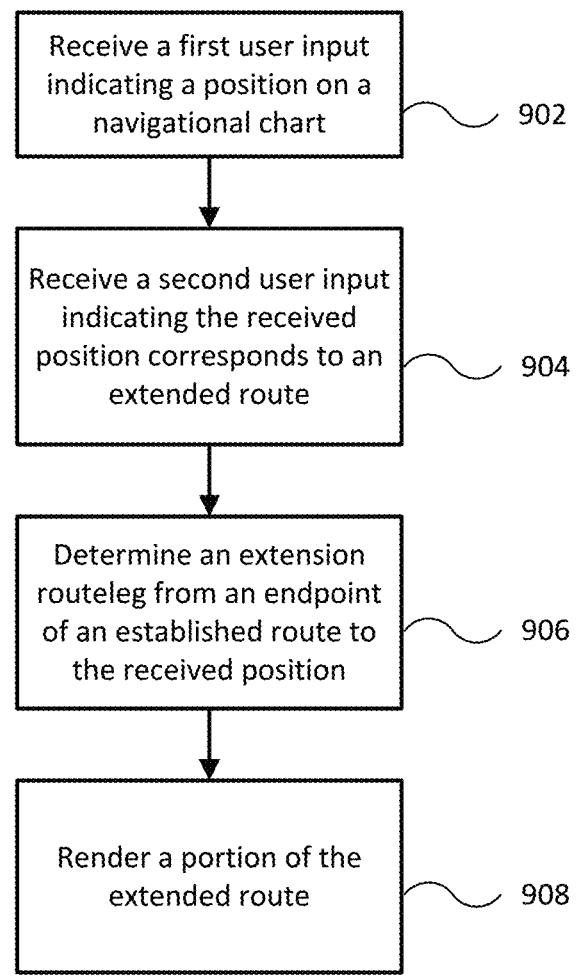
FIG. 9 illustrates a flow diagram of various operations to provide simplified route extension in accordance with an embodiment of the disclosure.

FIG. 9 illustrates a flow diagram of process 900 to provide simplified route extension for mobile structure 101 in accordance with an embodiment of the disclosure. In some embodiments, the operations of FIG. 9 may be implemented as software instructions executed by one or more logic devices associated with corresponding electronic devices, sensors, and/or structures depicted in FIGS. 1A-C and 2. More generally, the operations of FIG. 9 may be implemented with any combination of software instructions and/or electronic hardware (e.g., inductors, capacitors, amplifiers, actuators, or other analog and/or digital components).

It should be appreciated that any step, sub-step, subprocess, or block of process 900 may be performed in an order or arrangement different from the embodiments illustrated by FIG. 9. For example, in other embodiments, one or more blocks may be omitted, and other blocks may be included. Furthermore, block inputs, block outputs, various sensor signals, sensor information, calibration parameters, and/or other operational parameters may be stored to one or more memories prior to moving to a following portion of a corresponding process. Although process 900 is described with reference to systems 100, 100B, 100C, and/or 200 and/or display views in FIGS. 3A-5G and 8A-F, process 900 may be performed by other systems different from those systems and display views different from those views, including a different selection of electronic devices, sensors, assemblies, mobile structures, mobile structure attributes, user interfaces, graphics, menus, and/or graphics attributes.

At the initiation of process 900, various system parameters may be populated by prior execution of a process similar to process 900, for example, or may be initialized to zero and/or one or more values corresponding to typical, stored, and/or learned values derived from past operation of process 900, as described herein.

In block 902, a logic device receives a first user input indicating a position on a navigational chart. For example, user interface 120 and/or controller 130 of system 100 may be configured to receive user input by selector 860 indicating a position on navigational chart 810. In some embodiments, the received position may be selected relative to a single leg established route, such as that established by a GoTo navigation process, as described herein. In other embodiments, the received position may be selected relative to a multi-leg established route, such as that established by a route building navigation process, as described herein. User input may be provided by an electronic user input device, such as a mouse, joystick, touchpad, or other electronic user input device, for example, or by manipulation of a stylus or human finger on a touch screen display configured to display navigational chart 810 and detect/receive user input. In various embodiments, system 100 may be in an active navigation mode, for example, and be actively autopiloting mobile structure 101 while the first user input is received.

Upon receipt of the user input, user interface 120 and/or controller 130 may be configured to generate, render, and/or display menu 870 (e.g., or variants thereof) including one or more user selectable buttons including route extension button 873. In some embodiments, menu 870 may be and/or rendered over navigational chart 810 near the received position and/or with variable transparency to help maintain navigational awareness during process 900. User interface 120 and/or controller 130 may also be configured to generate, render, and/or display selection indicator 862 approximately at the received position, for example, to provide visual feedback to a user as to the received position. In such embodiments, the first user input may include or consist of a user selection of the received position. In one embodiment, the first user input may consist of a single user selection, button push, screen touch, or other type of user selection. In some embodiments, user interface 120 and/or controller 130 may be configured to acquire the position of a navigational object near the received position and set the received position to the navigational object position, such as upon selection of information button 874 on menu 870 by selector 860. In such embodiments, user interface 120 and/or controller 130 may be configured to render a waypoint symbol corresponding to the acquired navigational object, as described herein.

In further embodiments, user interface 120 and/or controller 130 may be used to select a position or predefined waypoint to act as the endpoint of a new route extension. For example, a user may select an endpoint of a new route extension from a database or list of waypoints, of other vessels (e.g., radar or AIS targets), and/or other navigational objects. A user may also designate an endpoint of a new route extension by entering coordinates (e.g., absolute coordinates, such as latitude and longitude, or relative coordinates, such as relative heading and range, for example) directly, as described herein. In various embodiments, navigational chart 810 may include cartographic data, sonar data, radar data, satellite image data, visible spectrum image data, infrared image data, and/or other navigational data, some or all of which may be provided by elements of system 100. System 100 may be configured to receive such navigational data and/or retrieve it from memory, for example, and generate at least a portion of navigational chart 810 based on the received navigational data.

In block 904, a logic device receives a second user input indicating the received position corresponds to an extended route. For example, user interface 120 and/or controller 130 may be configured to render contextual menu 870 proximate to the position received in block 902 and/or proximate selection indicator 862, and to receive user input by selector 860 of a button on menu 870. In some embodiments contextual menu 870 may include route extension button 873, and the second user input may include or consist of a user selection of the route extension button. In one embodiment, the second user input may consist of a single user selection, button push, screen touch, or other type of user selection. In various embodiments, no further user input or interaction may be required to complete process 900 and move through blocks 706 and/or 708, thereby providing relatively simplified route extension.

In block 906, a logic device determines an extension routeleg from an endpoint of an established route to a received position. For example, user interface 120 and/or controller 130 may be configured to determine extension routeleg 858 from prior endpoint 886 of a previously established route to the position received in block 902 (e.g., updated endpoint 888 in display view 805). In some embodiments, the previously established route may be a single leg route (e.g., established by a GoTo navigational process, for example). In other embodiments, the previously established route may be a multi-leg route, such as a multi-leg route generated by a detailed route building navigational process requiring an inactive navigational mode for system 100, as described herein.

In some embodiments, user interface 120 and/or controller 130 may be configured to detect a navigational hazard along the determined extension routeleg 858, such as in navigational data provided by AIS, radar, sonar, and/or other navigational sensors, as described herein. In such embodiments, user interface 120 and/or controller 130 may be configured to determine at least one additional extension routeleg and corresponding extension waypoint configured to cause mobile structure 101 to avoid or route around the detected navigational hazard and maintain endpoint 888 for extension routeleg 858 and/or the associated extended route corresponding to position received in block 902.

In block 908, a logic device renders a portion of an extended route. For example, user interface 120 and/or controller 130 may be configured to render at least a portion of an extended route on navigational chart 810 and/or a display of user interface 120. Such extended route may include extension routeleg 858 determined in block 906, a waypoint 886 of the corresponding established route, and/or a routeleg 856 or 854 of the established route, for example, so as to render enough information to help a user evaluate and modify the extended route and/or operate mobile structure 101 according to the extended route. In some embodiments, user interface 120 and/or controller 130 may be configured to render navigational chart 810 and mobile structure indicator 101b on user interface 120. Mobile structure indicator 101b may be configured to indicate a position and/or orientation of mobile structure 101 relative to an orientation of navigational chart 810 as rendered on user interface 120. In other embodiments, user interface 120 and/or controller 130 may be configured to convert endpoint 888 of an established route, as shown in display view 802, to waypoint 886 of the extended route shown in display view 805, for example, and to render a waypoint indicator or a waypoint rounding indicator corresponding to waypoint 886 of the extended route on user interface 120, as described herein, to facilitate safe navigation along such extended route. Any of the routing techniques and rendering methods and processes described herein may be performed in conjunction with one or more elements of process 900.

Once an extension routeleg is determined and/or the corresponding extended route is rendered on user interface 120 and/or chart 810, user interface 120 and/or controller 130 may be configured to generate provide control signals to steering actuator 150 and/or propulsion system 170 configured to autopilot the mobile structure according to the extended route. Thus, embodiments of the present disclosure provide a relatively simplified, reliable, and accurate method to extend established routes and/or create extended routes used to safely autopilot mobile structures.

It is contemplated that any one or combination of methods to provide simplified route extension, display, and/or navigation may be performed according to one or more operating contexts of a control loop, for example, such as a startup, learning, running, and/or other type operating context. For example, process 900 may proceed back to block 902 and proceed through process 900 again to produce updated display views and/or imagery, as in a control loop.

Embodiments of the present disclosure can thus provide an intuitive simplified user interface and facilitate route extension by a user/operator of a mobile structure. Such embodiments may be used to assist in navigation of a mobile structure and/or to assist in the operation of other systems, devices, and/or sensors coupled to the mobile structure.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A system comprising:
a user interface for a mobile structure, wherein the user interface comprises a display configured to display at least a portion of an established route for the mobile structure; and
a logic device configured to communicate with the user interface for the mobile structure, wherein the logic device is configured to:
receive a first user input indicating a position on a navigational chart;
receive a second user input indicating the received position corresponds to an extended route for the mobile structure;
determine at least one extension routeleg from an endpoint of the established route to the received position;
render at least a portion of the extended route on the display, wherein the extended route comprises the at least one extension routeleg, a waypoint of the established route, and/or a routeleg of the established route;
detect a navigational hazard along the extension routeleg; and
determine at least one additional extension routeleg and corresponding extension waypoint configured to avoid the detected navigational hazard and maintain an endpoint for the extended route corresponding to the received position.

2. The system of claim 1, wherein:
the established route is a single leg established route or a multi-leg established route.

3. The system of claim 1, wherein:
the first user input consists of a first single user selection, and the second user input consists of a second single user selection.

4. The system of claim 1, wherein the logic device is configured to:
render a selection indicator corresponding to the received position on the display before receiving the second user input, wherein the first user input comprises a user selection of the received position.

5. The system of claim 1, wherein the logic device is configured to:
render a contextual menu on the display proximate to the received position, wherein the contextual menu comprises a route extension button, and wherein the second user input comprises a user selection of the route extension button.

6. The system of claim 1, further comprising one or more navigational sensors for the mobile structure, wherein the logic device is configured to:
receive navigational data from the one or more navigational sensors; and
generate at least a portion of the navigational chart based on the received navigational data.

7. The system of claim 1, wherein:
the navigational chart comprises cartographic data, sonar data, radar data, satellite image data, visible spectrum image data, and/or infrared image data;
the logic device is configured to render the navigational chart and a mobile structure indicator on the display; and
the mobile structure indicator is configured to indicate a position and/or orientation of the mobile structure relative to an orientation of the navigational chart as rendered on the display.

8. The system of claim 1, wherein the logic device is configured to:
convert the endpoint of the established route to a waypoint of the extended route; and
render a waypoint indicator corresponding to the waypoint of the extended route on the display.

9. The system of claim 1, wherein:
the mobile structure comprises a watercraft; and
the logic device is configured to generate control signals configured to autopilot the mobile structure according to the extended route using a steering actuator and/or a propulsion system for the mobile structure.

10. The system of claim 1, wherein the navigational hazard is detected using radar data or sonar data.

11. A method comprising:
receiving, at a user interface for a mobile structure, a first user input indicating a position on a navigational chart, wherein the user interface comprises a display configured to display at least a portion of an established route for the mobile structure;
receiving a second user input indicating the received position corresponds to an extended route for the mobile structure;
determining at least one extension routeleg from an endpoint of the established route to the received position;
rendering at least a portion of the extended route on the display, wherein the extended route comprises the at least one extension routeleg, a waypoint of the established route, and/or a routeleg of the established route;
detecting a navigational hazard along the extension routeleg; and
determining at least one additional extension routeleg and corresponding extension waypoint configured to avoid the detected navigational hazard and maintain an endpoint for the extended route corresponding to the received position.

12. The method of claim 11, wherein:
the established route is a single leg established route or a multi-leg established route.

13. The method of claim 11, wherein:
the first user input consists of a first single user selection, and the second user input consists of a second single user selection.

14. The method of claim 11, further comprising:
rendering a selection indicator corresponding to the received position on the display before receiving the second user input, wherein the first user input comprises a user selection of the received position.

15. The method of claim 11, further comprising:
rendering a contextual menu on the display proximate to the received position, wherein the contextual menu comprises a route extension button, and wherein the second user input comprises a user selection of the route extension button.

16. The method of claim 11, further comprising:
receiving navigational data from one or more navigational sensors; and
generating at least a portion of the navigational chart based on the received navigational data.

17. The method of claim 11, wherein:
the navigational chart comprises cartographic data, sonar data, radar data, satellite image data, visible spectrum image data, and/or infrared image data;
the method further comprises rendering the navigational chart and a mobile structure indicator on the display; and
the mobile structure indicator is configured to indicate a position and/or orientation of the mobile structure relative to an orientation of the navigational chart as rendered on the display.

18. The method of claim 11, further comprising:
converting the endpoint of the established route to a waypoint of the extended route; and
rendering a waypoint indicator corresponding to the waypoint of the extended route on the display.

19. The method of claim 11, wherein:
the mobile structure comprises a watercraft; and
the method further comprises generating control signals configured to autopilot the mobile structure according to the extended route using a steering actuator and/or a propulsion system for the mobile structure.

20. The method of claim 11, wherein the navigational hazard is detected using radar data or sonar data.

* * * * *